United States Patent
Subramanian et al.

(10) Patent No.: US 9,853,898 B1
(45) Date of Patent: Dec. 26, 2017

(54) DYNAMIC SERVICE CHAIN PROVISIONING

(71) Applicant: Juniper Networks, Inc., Sunnyvale, CA (US)

(72) Inventors: Saravanadas P. Subramanian, San Jose, CA (US); Dhiraj D. Ballal, Santa Clara, CA (US); Wladimir Araujo Filho, Santa Clara, CA (US); Venkatesh B R Gota, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 232 days.

(21) Appl. No.: 14/698,928

(22) Filed: Apr. 29, 2015

(51) Int. Cl.
*H04L 12/741* (2013.01)
*H04L 29/06* (2006.01)
*H04L 12/14* (2006.01)
*H04L 29/08* (2006.01)

(52) U.S. Cl.
CPC ........ *H04L 45/745* (2013.01); *H04L 12/1407* (2013.01); *H04L 63/0272* (2013.01); *H04L 67/16* (2013.01)

(58) Field of Classification Search
CPC ............... H04L 45/745; H04L 12/1407; H04L 63/0272; H04L 67/16
See application file for complete search history.

(56) References Cited

U.S. PATENT DOCUMENTS

| | | |
|---|---|---|
| 7,184,437 B1 | 2/2007 | Cole et al. |
| 7,215,637 B1 | 5/2007 | Ferguson et al. |
| 7,990,993 B1 | 8/2011 | Ghosh et al. |
| 8,050,559 B2 | 11/2011 | Sindhu |
| 8,806,058 B1 | 8/2014 | Mackie et al. |
| 8,995,305 B2 | 3/2015 | Shaik et al. |
| 9,503,366 B2* | 11/2016 | Feng .................. H04L 41/0663 |
| 2013/0272305 A1* | 10/2013 | Lefebvre ................ H04L 47/24 370/392 |
| 2014/0313928 A1* | 10/2014 | Fernando ................ H04L 45/02 370/254 |

(Continued)

FOREIGN PATENT DOCUMENTS

WO   2013184846 A1   12/2013

OTHER PUBLICATIONS

"3GPP TS 29.212—Policy and Charging Control (PCC); Reference Points (Release 11)," Version 11.7.0, Feb. 2012, 196 pp.

(Continued)

*Primary Examiner* — Chi H Pham
*Assistant Examiner* — Weibin Huang
(74) *Attorney, Agent, or Firm* — Shumaker & Sieffert, P.A.

(57) ABSTRACT

In general, techniques for dynamically provisioning service chains are described. In one example a network device comprises a control unit having at least one processor coupled to a memory, wherein the control unit is configured to receive a services list comprising an ordered list of services, the ordered list of services specifying at least a first service and a second service. The network device also comprises a forwarding unit coupled to the control unit and configured to receive a packet of a packet flow from a first service node that has applied the first service to the packet, wherein the forwarding unit is configured to send, based at least on the ordered list of services, the packet to a second service node that applies the second service.

22 Claims, 9 Drawing Sheets

(56) References Cited

U.S. PATENT DOCUMENTS

| | | | |
|---|---|---|---|
| 2014/0351452 A1* | 11/2014 | Bosch | H04L 67/10 709/242 |
| 2015/0026362 A1* | 1/2015 | Guichard | H04L 45/30 709/242 |
| 2015/0222526 A1* | 8/2015 | Baykal | H04L 45/308 370/352 |
| 2016/0036707 A1* | 2/2016 | Mestery | H04L 41/12 370/230 |
| 2016/0277509 A1* | 9/2016 | Qiang | H04L 67/1002 |
| 2016/0315921 A1* | 10/2016 | Dara | H04L 69/22 |

OTHER PUBLICATIONS

"3GPP TS 23.203—Policy and Charging Control Architecture (Release 10)" Version 10.1.0, 3rd Generation Partnership Project, Technical Specification Group Services and System Aspects, Sep. 2010, 132 pp.

Cablelabs et. al, Data-Over-Cable Service Interface Specifications, DOCSIS 1.1, Operations Support System Interface Specification SP-OSSI-v1.1, Cable Television Laboratories, Inc., Louisville, CO, Mar. 12, 2003, 70 pp.

Cablelabs et. al, Data-Over-Cable Service Interface Specifications, DOCSIS 3.0, MAC and Upper Layer Protocols Interface Specification, CM-SP-MULPIv3.0, Cable Television Laboratories, Inc., Louisville, CO., Aug. 3, 2007, 69 pp.

U.S. Appl. No. 14/042,685, by Jerome P. Moisand, filed Sep. 30, 2013.

Fernando et al., "Virtual Topologies for Service Chaining in BGP/IP MPLS VPNs," draft-rfernando-l3vpn-service-chaining-03, Internet-Draft, Oct. 18, 2013, 15 pp.

Patel et al., "BGP vector routing," draft-patel-raszuk-bgp-vector-routing-03, Network Working Group, Internet-Draft, Apr. 21, 2014, 12 pp.

Kompella et al., "Signaling Virtual Machine Activity to the Network Virtualization Edge," draft-kompella-nvo3-server2nve-02, Network Working Group, Internet-Draft, Apr. 29, 2013, 19 pp.

"Service Chaining," Juniper Networks, Sep. 16, 2013, retrieved from http://juniper.net/techpupbs/en_US/contrail1.0/topics/task/configuration/service-chaining-vinc.html, 3 pp.

"Enabling Service Chaining on Cisco Nexus 1000V Series Introduction White Paper," Cisco, Sep. 27, 2012, retrieved from http://www.cisco.com/c/en/us/products/collateral/switches/nexus-1000v-switch-vmware-vsphere/white_paper-C11-716028.pdf, 25 pp.

Rosen, "BGP/MPLS IP Virtual Private Networks (VPNs)," Network Working Group, RFC 4364, Feb. 2006, 47 pp.

Fajarado et al., Diameter Base Protocol, IETF, RFC 6733, Oct. 2012, 152 pp.

* cited by examiner

DYNAMIC SERVICE CHAIN PROVISIONING

TECHNICAL FIELD

The invention relates to computer networks and, more specifically, to applying network services to network traffic traversing computer networks.

BACKGROUND

A computer network is composed of a set of nodes and a set of links that connect one node to another. For instance, a computer network may be composed of a set of routers while the set of links may be cables between the routers. When a first node in the network sends a message to a second node in the network, the message may pass through many links and many nodes. The set of links and nodes that the message passes through while traveling from the first node to the second node is referred to as a path through the network.

A network operator may deploy one or more network devices to implement service points that apply network services such as firewall, carrier grade network address translation (CG-NAT), performance enhancement proxies for video, transport control protocol (TCP) optimization and header enrichment, caching, and load balancing. In addition, the network operator may configure service chains that each identifies a set of the network services to be applied to packet flows mapped to the respective service chains. A service chain, in other words, defines one or more network services to be applied in a particular order to provide a composite service for application to packet flows bound to the service chain.

SUMMARY

In general, techniques for dynamically provisioning service chains are described. For example, a service control gateway may be provisioned by a policy server with an ordered list of services to be applied to packet flows. Based on the list of services, the service control gateway may orchestrate traversal of the ordered list of services by the packets flows and, in this way, dynamically stitch together a service chain made up of the ordered list of services for application to the packet flows.

In one example implementation, the ordered list of services is bifurcated into an uplink ordered list ("uplink services list") of virtual private network (VPN) routing and forwarding instances/tables (VRFs) of the service control gateway and a downlink ordered list ("downlink services list") of VRFs of the service control gateway. Each VRF of the uplink services list may specify a matching route for the packet flows to the corresponding service, and each VRF of the downlink services list may specify a matching route for the packet flows to a VRF of the uplink services list or a matching route for the packet flows to the default routing table. The service control gateway may stitch together VRFs of the uplink services list and downlink services list to implement respective service chains for uplink packets destined for a packet data network (or "PDN," e.g., the Internet) and for downlink packets destined for a subscriber (for instance) and received from the PDN. By enabling the service control gateway to orchestrate and stitch together different combinations of services dynamically from an ordered list of services, the techniques may facilitate dynamic service chaining by a services gateways.

In one example, a method comprises receiving, by a service control gateway, a services list comprising an ordered list of services, the ordered list of services specifying at least a first service and a second service. The method also comprises receiving, by the service control gateway, a packet of a packet flow from a first service node that has applied the first service to the packet. The method also comprises sending, by the service control gateway based at least on the ordered list of services, the packet to a second service node that applies the second service.

In another example, network device comprises a control unit having at least one processor coupled to a memory, wherein the control unit is configured to receive a services list comprising an ordered list of services, the ordered list of services specifying at least a first service and a second service. The network device also comprises a forwarding unit coupled to the control unit and configured to receive a packet of a packet flow from a first service node that has applied the first service to the packet, wherein the forwarding unit is configured to send, based at least on the ordered list of services, the packet to a second service node that applies the second service.

In another example, a non-transitory computer-readable storage medium comprising instructions for causing one or more programmable processors of a network device to configure, by a gateway coupled to a plurality of service nodes by respective virtual private networks (VPNs), a separate input virtual routing and forwarding table (VRF) and output VRF for each of the VPNs; receive, by the gateway, an ordered list specifying a service chain for processing packets of a packet flow through an ordered set of the service nodes, wherein the ordered list specifies the service chain as sequences of the input VRFs and the output VRFs for the VPNs associated with the service nodes; and send and receive, by the gateway, packets of the packet flow in accordance with the specified sequences of the input VRFs and the output VRFs to forward packets along the service chain.

In another example, a system comprises a first service node configured to apply a first service; a second service node configured to apply a second service; and a network device comprising at least one processor coupled to a memory, wherein the network device is configured to receive a services list comprising an ordered list of services, the ordered list of services specifying at least a first service and a second service, wherein the network device is configured to receive a packet of a packet flow from the first service node that has applied the first service to the packet, wherein the network device is configured to send, based at least on the ordered list of services, the packet to the second service node configured to apply the second service.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

Like reference characters denote like elements throughout the figures and text.

DETAILED DESCRIPTION

Figure 1:
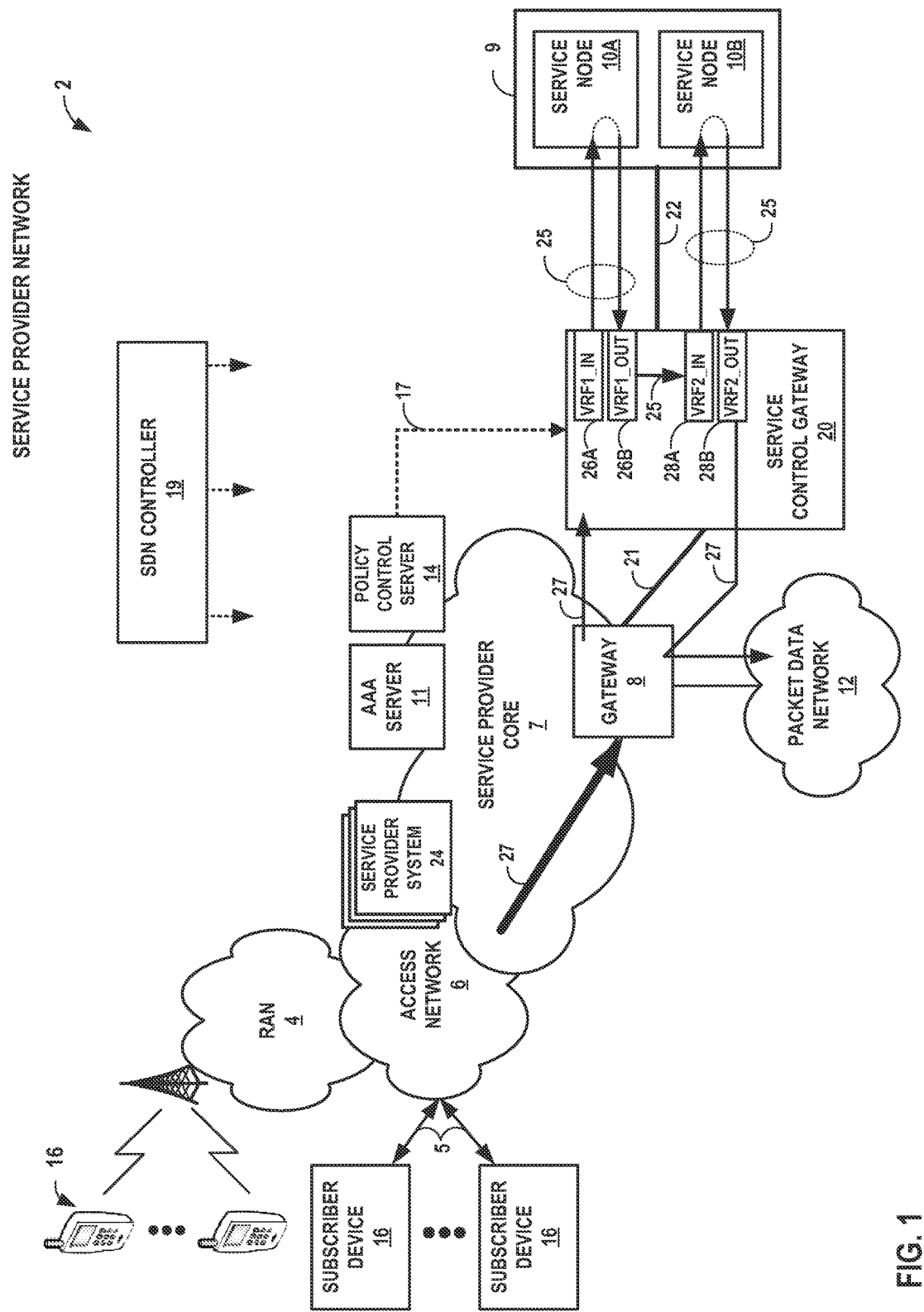
FIG. 1 is a block diagram illustrating an example network system in accordance with techniques described herein.

FIG. 1 illustrates an example network system in accordance with techniques described herein. The example network system of FIG. 1 includes a service provider network 2 that operates as a private network to provide packet-based network services to subscriber devices 16A-16N (collectively, "subscriber devices 16"). That is, service provider network 2 provides authentication and establishment of network access for subscriber devices 16 such that the subscriber device may begin exchanging data packets with PDN 12, which may represent an internal packet-based network of the service provider or an external packet-based network such as the Internet.

In the example of FIG. 1, service provider network 2 includes access network 6 ("access network 6") that provides connectivity to packet data network (PDN) 12 via service provider core network 7 including gateway 8. Service provider core network 7 and PDN 12 provide packet-based services that are available for request and use by subscriber devices 16. As examples, core network 7 and/or PDN 12 may provide, for example, bulk data delivery, voice over Internet protocol (VoIP), Internet Protocol television (IPTV), Short Messaging Service (SMS), Wireless Application Protocol (WAP) service, or customer-specific application services. Packet data network 12 may comprise, for instance, a local area network (LAN), a wide area network (WAN), the Internet, a virtual LAN (VLAN), an enterprise LAN, a layer 3 virtual private network (L3VPN), an Internet Protocol (IP) intranet operated by the service provider that operates access network 6, an enterprise IP network, or some combination thereof. In various embodiments, PDN 12 is connected to a public WAN, the Internet, or to other networks. Packet data network 12 executes one or more packet data protocols (PDPs), such as IP (IPv4 and/or IPv6), X.25 or Point-to-Point Protocol (PPP), to enable packet-based transport of PDN 12 services.

Subscriber devices 16 connect to gateway 8 via access network 6 to receive connectivity to subscriber services for applications hosted by subscriber devices 16. A subscriber may represent, for instance, an enterprise, a residential subscriber, or a mobile subscriber. Subscriber devices 16 may be, for example, personal computers, laptop computers or other types of computing device associated with subscribers. In addition, subscriber devices 16 may comprise mobile devices that access the data services of service provider network 2 via radio access network (RAN) 4. Example mobile subscriber devices include mobile telephones, laptop or desktop computers having, e.g., a 3G wireless card, wireless-capable netbooks, video game devices, pagers, smart phones, personal data assistants (PDAs) or the like. Each of subscriber devices 16 may run a variety of software applications, such as word processing and other office support software, web browsing software, software to support voice calls, video games, videoconferencing, and email, among others. Subscriber devices 16 connect to access network 6 via access links that comprise wired and/or wireless communication links. The term "communication link," as used herein, comprises any form of transport medium, wired or wireless, and can include intermediate nodes such as network devices. Each of access links may comprise, for instance, aspects of an asymmetric DSL network, WiMAX, a T-1 line, an Integrated Service Digital Network (ISDN), wired Ethernet, or a cellular radio link.

A network service provider operates, or in some cases leases, elements of access network 6 to provide packet transport between subscriber devices 16 and gateway 8. Access network 6 represents a network that aggregates data traffic from one or more subscribers for transport to/from service provider core network 7 of the service provider. Access network 6 includes network nodes that execute communication protocols to transport control and user data to facilitate communication between subscriber devices 16 and gateway 8. Access network 6 may include a broadband access network, network, a wireless LAN, a public switched telephone network (PSTN), or other type of access network, and may include or otherwise provide connectivity for cellular access networks, such as radio access network (RAN) 4 of FIG. 1. Examples of access network 6 may also include networks conforming to a Universal Mobile Telecommunications System (UMTS) architecture, an evolution of UMTS referred to as Long Term Evolution (LTE), mobile IP standardized by the Internet Engineering Task Force (IETF), as well as other standards proposed by the $3^{rd}$ Generation Partnership Project (3GPP), $3^{rd}$ Generation Partnership Project 2 (3GGP/2) and the Worldwide Interoperability for Microwave Access (WiMAX) forum.

Service provider core network 7 (hereinafter, "core network 7") offers packet-based connectivity to subscriber devices 16 attached to access network 6 for accessing PDN 12. Core network 7 may represent a public network that is owned and operated by a service provider to interconnect a plurality of networks, which may include access network 6. Core network 7 may implement Multi-Protocol Label Switching (MPLS) forwarding and in such instances may be referred to as an MPLS network or MPLS backbone. In some instances, core network 7 represents a plurality of interconnected autonomous systems, such as the Internet, that offers services from one or more service providers. PDN 12 may represent an edge network coupled to core network 7, e.g., by a customer edge device such as customer edge switch or router. PDN 12 may include a data center.

In examples of network 2 that include a wireline/broadband access network, gateway 8 may represent a Broadband Network Gateway (BNG), a Broadband Remote Access Server (BRAS), MPLS Provider Edge (PE) router, core router or gateway, or a Cable Modem Termination System (CMTS), for instance. In examples of network 2 that include a cellular access network as access network 6, gateway 8 may represent a mobile gateway, for example, a Gateway General Packet Radio Service (GPRS) Serving Node (GGSN), an Access Gateway (aGW), or a Packet Data Network (PDN) Gateway (PGW). In other examples, the functionality described with respect to gateway 8 may be implemented in a switch, service card or other network element or component. Core network 7 may provide access to multiple different access networks 6 conforming to different access types both wireline and wireless, e.g., cellular/GPRS/UMTS, broadband or other wireline, and so forth.

A network service provider that administers at least parts of network 2 typically offers services to subscribers associated with devices, e.g., subscriber devices 16, which access the service provider network. Services offered may include, for example, traditional Internet access, Voice-over-Internet Protocol (VoIP), video and multimedia services, and security services. As described above with respect to access network 6, core network 7 may support multiple types of access network infrastructures that connect to service provider network access gateways to provide access to the offered services. In some instances, network system 2 may include subscriber devices 16 that attach to multiple different access networks 6 having varying architectures.

In general, any one or more of subscriber devices 16 may request authorization and data services by sending a session request to gateway 8. In turn, gateway 8 typically accesses Authentication, Authorization and Accounting (AAA) server 11 to authenticate the subscriber device requesting network access. Once authenticated, any of subscriber devices 16 may send subscriber data traffic toward service provider core network 7 in order to access and receive services provided by PDN 12, and such packets traverse gateway 8 as part of at least one packet flow. Flows 27 illustrated in FIG. 1 represent one or more upstream or "uplink" packet flows from any one or more subscriber devices 16 and directed to PDN 12 via gateway 8, which is a next hop for PDN 12 for traffic from subscribers. Downstream or "downlink" flows originated by PDN 12 are directed to subscriber devices 16 (not shown in FIG. 1).

The term "packet flow," "traffic flow," or simply "flow" refers to a set of packets originating from a particular source device and sent to a particular destination device. Service traffic may include multiple different flows. A single flow of packets, in either the upstream (sourced by one of subscriber devices 16) or downstream (destined for one of subscriber devices 16) direction, may be identified by the 5-tuple: <source network address, destination network address, source port, destination port, protocol>, for example. This 5-tuple generally identifies a packet flow to which a received packet corresponds. An n-tuple refers to any n items drawn from the 5-tuple. For example, a 2-tuple for a packet may refer to the combination of <source network address, destination network address> or <source network address, source port> for the packet. Moreover, a subscriber device may originate multiple packet flows upon authenticating to service provider network 2 and establishing a communication session for receiving data services.

As described herein, service provider network 2 includes a services complex 9 having a cluster of service nodes 10A-10B (collectively, "service nodes 10") that provide an execution environment for corresponding network services. That is, each of service nodes 10 apply one or more services. As examples, service nodes 10 may apply firewall and security services, carrier grade network address translation (CG-NAT), media optimization (voice/video), IPSec/VPN services, deep packet inspection (DPI), HTTP filtering, parental control, caching and content delivery services, web awareness/applications, counting, accounting, charging, and load balancing of packet flows or other types of services applied to network traffic. Each of service nodes 10 in this way represents a service instance. Although illustrated with only two service nodes 10, services complex 9 may include many thousands of such service nodes 10 each providing one or more services to data traffic.

Each of service nodes 10 may alternatively be referred to as a "service point," "value-added service (VAS) point" or node, or "network function virtualization (NFV) node." Network function virtualization involves orchestration and management of networking functions such as a Firewalls, Intrusion Detection or Preventions Systems (IDS/IPS), Deep Packet Inspection (DPI), caching, Wide Area Network (WAN) optimization, etc. in virtual machines instead of on physical hardware appliances. Network function virtualization in the service provider network may provide Value Added Services (VAS) for edge networks such as business edge networks, broadband subscriber management edge networks, and mobile edge networks. Access network 6 of FIG. 1 is an example of an edge network for service provider network 2 of FIG. 1.

Service control gateway 20 operates as a gateway for the services complex 9 to anchor the delivery of dynamic service selection and application to packet flows. Service control gateway 20 may perform traffic detection, policy enforcement, and service steering according to techniques described herein. Service control gateway 20 may provide subscriber-aware, device-aware, and/or application-aware traffic detection and granular traffic steering functionality with policy interfaces. Service control gateway 20 may include integrated L4-L7 deep packet inspection (DPI), for instance. Service control gateway 20 may in some cases be combined with other embedded networking functions (such as carrier-grade NAT and firewall/load balancer) to consolidate components of the services complex 9 into a single network element.

Service control gateway 20 may represent is a physical gateway router or switch that connects virtual networks of the services complex 9 to physical networks such core network 9, the Internet, a customer VPN (e.g., L3VPN), another data center, or to non-virtualized servers. In such examples, services complex 9 may include layer two (L2) and layer three (L3) switching and routing components that provide point-to-point connectivity between servers (not shown) that execute one or more of service nodes 10 within a virtual environment. That is, one or more of service nodes 10 may run as virtual machines in a virtual compute environment. Moreover, the compute environment may comprise a scalable cluster of general computing devices, such as x86 processor-based servers. As another example, service nodes 10 may comprise a combination of general purpose computing devices and special purpose appliances. In some examples, service control gateway 20 represents a server, process, virtual machine, or controller executing within services complex 9.

As virtualized, individual network services provided by service nodes 10 can scale just as in a modern data center, through the allocation of virtualized memory, processor utilization, storage and network policies, as well as horizontally by adding additional load-balanced virtual machines. In one example, services complex 9 comprises a set of interconnected, high-performance yet off-the-shelf packet-based routers and switches that implement industry standard protocols. In one example, services complex 9 may comprise off-the-shelf components that provide Internet Protocol (IP) over an Ethernet (IPoE) point-to-point connectivity.

In the illustrated example, a software-defined networking (SDN) controller 19 may provide a high-level controller for configuring and managing routing and switching infrastructure of service provider network 2 (e.g., gateway 8, service control gateway 20, core network 7 and service nodes 10).

The SDN controller 19 provides a logically and in some cases physically centralized controller for facilitating operation of one or more virtual networks within services complex. In some instances, the SDN controller 19 manages deployment of virtual machines within the operating environment of value-added services complex 9. The SDN controller 19 communicates with service control gateway 20 to specify information for implementing service chain 25, such as virtual routing and forwarding instances configuration. Service chain information provided by an SDN controller 19 may specify any combination and ordering of value-added services provided by service nodes 10, traffic engineering information (e.g., labels or next hops) for tunneling or otherwise transporting (e.g., MPLS or IP tunnels) packet flows along service paths, rate limits, Type Of Service (TOS) markings or packet classifiers that specify criteria for matching packet flows to a service chain. Additional information regarding a SDN controller operating as a virtual network controller in conjunction with other devices of services complex 9 or other software-defined network is found in International Application Number PCT/US2013/044378, filed Jun. 5, 2013, and entitled PHYSICAL PATH DETERMINATION FOR VIRTUAL NETWORK PACKET FLOWS, which is incorporated by reference as if fully set forth herein.

In accordance with techniques described herein and as shown in FIG. 1, service control gateway 20 receives flows 27 from gateway 8 via link 21 (which may represent one or more physical links or networks) and steers individual subscriber packet flows 27 through dynamically provisioned and ordered lists of services provided by service nodes 10. That is, each subscriber packet flow may be forwarded through a particular ordered combination of services provided by service nodes 10, each ordered set being referred to herein as a "service chain." Gateway 8 may direct flows 27 to service control gateway 20 via an access virtual private network (VPN) routing and forwarding table (VRF) configured in gateway 8 and service control gateway 20.

In the example of FIG. 1, one or more uplink subscriber packet flows 27 are directed along a service chain 25 from service control gateway 20, to service node 10A, to service control gateway 20, to service node 10B, to service control gateway 20. Service chain 25 having been applied to flows 27, service control gateway 20 forwards the flows 27 according to the default routing table, e.g., to return flows 27 to gateway 8 (in the illustrated example) or to bypass gateway 8 to forward the flows 27 directly to PDN 12. In this way, subscriber flows 27 may be processed by service control gateway 20 and service nodes 10 as the packets flow between access network 6 and PDN 12 according to service chains configured by the service provider. A particular node 10 may support multiple service chains.

Whereas a "service chain" defines one or more services to be applied in a particular order to provide a composite service for application to packet flows bound to the service chain, a "service tunnel" or "service path" refers to a logical and/or physical path taken by packet flows processed by a service chain along with the forwarding state for forwarding packet flows according to the service chain ordering. Each service chain may be associated with a respective service tunnel, and packet flows associated with each subscriber device 16 flow along service tunnels in accordance with a service profile associated with the respective subscriber. The arrows denoted as service chain 25 illustrate the path taken by packet flows mapped to the service chain 25 by service control gateway. For example, a given subscriber may be associated with a particular service profile, which in turn is mapped to service chain 25. Similarly, another subscriber may be associated with a different service profile, which in turn is mapped to a service tunnel associated with service chain. Service control gateway 20, in some instances after authenticating and establishing access sessions for the subscribers, may direct packet flows for the subscribers along the appropriate service tunnels, thereby causing service complex 9 to apply the requisite ordered services for the given subscriber. In various examples, service control gateway 20 may apply steer traffic to, e.g., service chain 25, based on DPI-based traffic detection, subscriber or device policies, or other basis.

Service nodes 10 may cooperate with service control gateway 20 to implement service chain 25 using internally configured forwarding state that directs packets of the packet flow along the service chain 25 for processing according to the identified set of service nodes 10. Such forwarding state may specify tunnel interfaces for tunneling between service nodes 10 and service control gateway 20 using network tunnels such as Internet Protocol (IP) or Generic Route Encapsulation (GRE) tunnels, or by using Virtual Local Area Networks (VLANs), Multiprotocol Label Switching (MPLS) techniques, and so forth. In some instances, real or virtual switches, routers or other network elements that interconnect connect service nodes 10 may be configured to direct packet flows to the service nodes 10 and service control gateway 20 according to service chain 25. One or more tunnel endpoints for a service chain 25 may each be associated with a different virtual private network overlaying a physical underlay network. Such a tunnel endpoint may be logically located and implemented by a network element that has a routing instance (e.g. a VRF) for the virtual private network for the tunnel endpoint. Such a network element, whether physical or virtual, may be considered and alternatively referred to as a provider edge (PE) router for the virtual private network for the tunnel endpoint. A network element may be a PE router for multiple virtual private networks. In some examples, network system 2 implements VPNs using techniques described in Rosen & Rekhter, Request for Comments 4364, February 2006, Internet Engineering Task Force (IETF) Network Working Group, the entire contents of which is incorporated by reference herein.

Service provider network 2 may include an Authentication, Authorization and Accounting server 11 ("AAA server 11). For example, upon detecting a new traffic flow, service control gateway 20 may authenticate new subscribers to AAA server 11, e.g., by way of the Radius or Diameter protocols, and, at this time, receive a service profile or other information that defines the services to be applied to the subscriber or maps the various traffic expected for the subscriber to one or more service flows. Upon detecting a new flow, the service control gateway 20 selects the service chain for the flow based on the service profile and traffic type. For example, service control gateway 20 selects one of the service chains for the packet based on the service profile received for the subscriber and/or based on the type of traffic, e.g., HTTP traffic or VoIP traffic.

In accordance with techniques described herein, SDN controller 19 provisions components of service provider network 2 with forwarding information to enable service control gateway 20 and services nodes 20 to direct the components to forward traffic along service chain 25. In the illustrated example, SDN controller 19 provisions service control gateway 20 with at least four VRFs: VRF1_IN 26A, VRF1_OUT 26B, VRF2_IN 28A, and VRF2_OUT 28B. Service control gateway 20 includes VRFs 26, 28 having respective routing instances that include interfaces for service nodes 10A and 10B. Service control gateway 20 may also include at least one access routing and forwarding instance for exchanging traffic with gateway 8. SDN controller 19 may communicate with service control gateway 20 to manipulate route targets and provision service node 10 servers and/or advertise routes within the virtual and/or physical networks. In some examples, an operator may configure IP-VPNs within service control gateway 20 to establish VRFs 26, 28.

Each of service nodes 10 is associated with two VRFs at service control gateway 20, an in-VRF for service traffic toward the service node, and an out-VRF for service traffic from the service node. In the example of FIG. 1, service node 10A is associated with in-VRF VRF1_IN 26A and with out-VRF VRF_OUT 26B (collectively, "VRFs 26"). Service node 10A is configured to apply a service to service traffic received from service control gateway 20 via VRF_IN 26A and to return the service traffic to the service control gateway 20 via VRF_OUT 26B. Each of VRFs 26, 28 configured in service control gateway 20 may include at least one virtual interface, such as an attachment circuit, by which service control gateway 20 may identify VRFs 26, 28 with which to process incoming service traffic. Service node 10B is associated with in-VRF VRF2_IN 28A and with out-VRF VRF_OUT 28B (collectively, "VRFs 28"). Service node 10B is configured to apply a service to service traffic received from service control gateway 20 via VRF_IN 28A and to return the service traffic to the service control gateway 20 via VRF_OUT 28B.

VRF1_IN 26A sends and VRF1_OUT 26B receives packets exchanged between service control gateway 20 and service node 10A. VRF2_IN 28A sends and VRF2_OUT 28B receives packets exchanged between service control gateway 20 and service node 10B.

In some examples, SDN controller 19 automatically configures virtual private networks to establish a virtual network topology for service nodes 10 to direct service traffic received from service control gateway 20 back to service control gateway 20. In some examples, service nodes 10 and service control gateway 20 may be configured with IP-VPNs to establish respective point-to-point service topologies for the service nodes 10 and service control gateway 20.

In accordance with techniques described in this disclosure, policy control server 14 dynamically provisions service control gateway 20 with an ordered list of services for flows 27 to cause the service control gateway 20 to steer flows 27 along a service chain defined by the ordered list of services and the service nodes 10 corresponding to the services. In other words, service control gateway 20 orchestrates traversal of the ordered list of services (applied and represented by service nodes 10), specified by services list 17, by flows 27 and, in this way, dynamically stitches together service chain 25 made up of the ordered list of services for application of services to matching traffic.

In one example, policy control server 14 implements a policy interface (e.g., Diameter or Remote Authentication Dial-In User Service (RADIUS) to send services list 17 to service control gateway 20. Services list 17 includes an ordered list of services for service chain 25 for flows 27.

For instance, policy control server 14 may represent a Policy Control and Charging Rules Function (PCRF) device for mobile (e.g., 3GPP) subscriber devices 16 or, alternatively or in addition, a Broadband Policy Control Framework (BPCF) device for broadband/wireline subscriber devices 16. Accordingly, service control gateway 20 may in some cases implement a Policy Charging and Enforcement Function (PCEF) for any or both of the above functions, or for another function. Policy control server 14 and service control gateway 20 may communicate according to a Gx reference point that defines a protocol for signaling of policy and charging control (PCC) rules that determine treatment of matching service data flows in a Policy and Charging Enforcement Function. A PCC rule includes a rule identifier that uniquely identifies the rule within a subscriber session, service data flow detection information, charging information, and/or policy control information.

Policy control server 14 may install the new (and/or modified) PCC rules for service sessions to service control gateway using PCC rule installation messages sent over the Gx reference point between policy control server 14 (operating at least in part as a PCRF/BPCF) and service control gateway (operating at least in part as a PCEF). The Gx interface may include a protocol stack that includes, for example, Remote Authentication Dial-In User Service (RADIUS) or Diameter. Accordingly, PCC rule installation messages may include a Charging-Rule-Install attribute-value pair (AVP) that specifies a Charging-Rule-Definition AVP. A PCC rule installation message for a PCC rule may further include services list 17 for dynamically defining a service chain for service data flows that match the PCC rule (flows 27 in FIG. 1). PCC rules installed to service control gateway 20 by policy control server 14 may be static or dynamic (e.g., static Gx or dynamic Gx). The PCC rule installation message may represent a Diameter Credit Control Answer (CCA) that includes services list 17 as, e.g., one or more AVPs. The Diameter CCA may be responsive to an earlier Diameter Credit Control Request (CCR) (initial or update) issued by service control gateway, e.g., in response to detecting a new application or a new subscriber, or receiving a RADIUS Accounting Request message from gateway 8 for a new application or a new subscriber.

Upon receiving a new or modified PCC rule and associated services list 17 included in a PCC rule installation message, service control gateway 20 applies the ADC rule to traffic received from gateway 8 to identify packet flows that match the ADC rule. The service control gateway 20 steers matching packet flows along a service chain that includes the service of service nodes 10 defined by the services list 17 associated with the PCC rule.

In some cases, service control gateway 20 implements a traffic detection function (TDF) to perform application traffic detection and dynamic steering of matching application traffic along a service chain according to techniques described herein. In such cases, service control gateway 20 receives rules from policy control server 14 (operating as a PCRF/BPCF) that are known as Application Detection and Control (ADC) rules, which policy control server 14 may provide and activate by an Sd reference point. Service control gateway 20 may in some examples apply, to detected application traffic, enforcement actions such as gating, redirection, and bandwidth limiting.

Policy control server 14 may generate ADC rules in association with an ordered list of services, in accordance with techniques described herein. For instance, policy control server 14 may generate an ADC rule for a Traffic Detection Function (TDF) session for a subscriber session for one of subscriber devices 16. The generated ADC rule may include a rule identifier, TDF application identifier, monitoring key, gateway status, uplink/downlink maximum bit rates (MBRs), and redirection information. Policy control server 14 additionally generates the services list 17 that specifies the ordered list of services to be applied to application traffic that match the generated ADC rule (flows 27 in FIG. 1).

Policy control server 14 installs the ADC rule to service control gateway 20, via an Sd interface, using an ADC installation message instance. The Sd interface may include a protocol stack that includes, for example, RADIUS or Diameter. The ADC rule installation message may thus include an ADC-Rule-Install AVP, for instance. The ADC rule installation message may further include the services list 17 in association with the ADC rule. ADC rules installed to service control gateway 20 by policy control server 14 may be static or dynamic (e.g., static Sd or dynamic Sd).

Upon receiving an ADC rule and associated services list 17 included in an ADC rule installation message, service control gateway 20 applies the ADC rule to traffic received from gateway 8 to identify flows 27 that match the ADC rule. The service control gateway 20 steers matching flows 27 along a service chain 25 that includes the service nodes 10 defined by the services list 17 associated with the ADC rule.

The ordered list of services may be bifurcated into an uplink ordered list ("uplink service list") of virtual routing and forwarding table (VRFs) of the service control gateway and a downlink ordered list ("downlink service list") of VRFs of the service control gateway. Each VRF of the uplink ordered list may represent a start point of a corresponding service in a service chain, and each VRF of the downlink ordered list may represent an end point of the corresponding service in the service chain. The service control gateway 20 stitches together VRFs of the uplink ordered list and downlink ordered list to implement respective service chains for uplink packets issued by a subscriber and destined for PDN 12 and for downlink packets destined for the subscriber and received from PDN 12.

In this example of FIG. 1, services list 17 may include an uplink ordered list specifying, in order, VRF1_IN 26A and VRF2_IN 28A; services list 17 also includes a downlink ordered list specifying, in order, VRF1_OUT 26B and VRF2_OUT 28B. Service control gateway 20 stitches together the combination of service nodes 10 based on services list 17 including the uplink ordered list and downlink ordered list, as described in example detail below. In this way, the techniques may facilitate dynamic service chaining by service provider network 2. The techniques may thus provide the service control gateway 20, and the administrator/operator thereof, with the capability to dynamically orchestrate any combination of services, provided by service nodes 10, from a list of services and create service chains by stitching together the combinations. This may provide advantages over statically provisioned service chains by, e.g., enabling dynamic modification of the service chain for a packet flow 27 by the policy control server 14 and thus modify the ordering, type, and/or number of services applied to packets of the packet flow 27.

Figure 2:
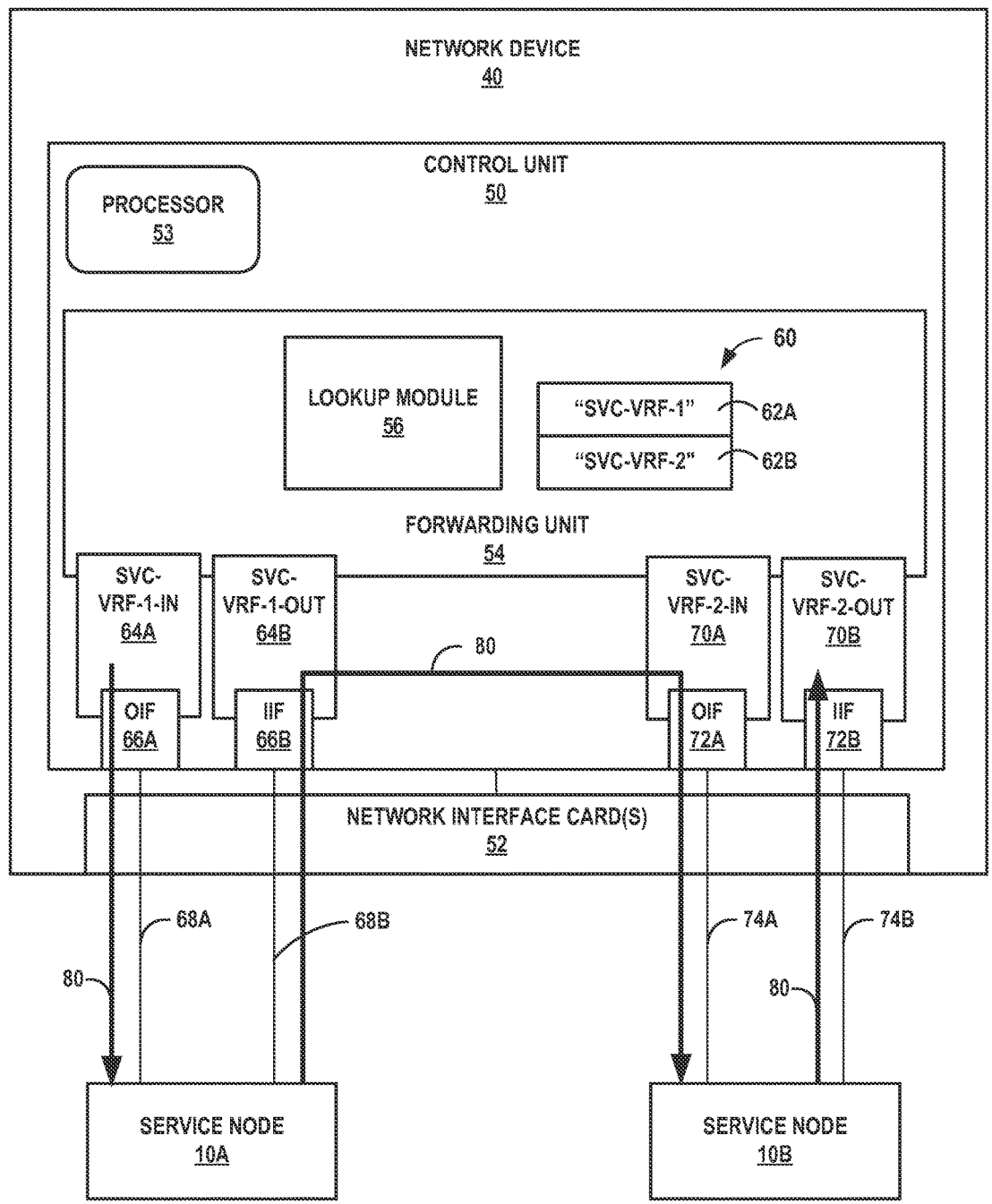
FIG. 2 is block diagram illustrating, in further detail, an example network device according to techniques described in this disclosure.

FIG. 2 is block diagram illustrating, in further detail, an example network device according to techniques described in this disclosure. Network device 40 may represent an example instance of service control gateway 20 of FIG. 1. Network device 40 includes a control unit 50 coupled to one or more network interface card(s) 52 ("NICs 52"), which transmit and receive packet data via one or more communication links. Control unit 50 includes at least one processor 53 that executes software instructions, such as those used to define a software or computer program, stored to a tangible computer-readable medium (not shown in FIG. 2), such as a storage device (e.g., a disk drive, or an optical drive), or memory (such as Flash memory, random access memory or RAM) or any other type of volatile or non-volatile memory, that stores instructions to cause a programmable processor to perform the techniques described herein. Alternatively, or in addition, control unit 50 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware.

Control unit 50 configures forwarding unit 54 with VRFs by which network device 40 exchanges service traffic with a plurality of service nodes 10. Forwarding unit 54 includes two separate VRFs for communicating with each service node of service nodes 10, an "in" VRF having an outgoing interface (OIF) for sending service traffic to the service node, and an "out" VRF having an incoming interface (IIF) for receiving service traffic from the service node. Forwarding unit 54 may represent a module executed by processor 53 or a separate forwarding unit, such as one or more line cards having packet processors for high-speed packet processing a coupled to control unit 50. Reference herein to incoming and outgoing interfaces may refer to virtual or software interfaces configured in the device.

In the illustrated example, forwarding unit 54 is configured with SVC-VRF-1-IN 64A having OIF 66A and SVC-VRF-1-OUT 64B having IIF 66B. OIF 66A is an interface to an attachment circuit 68A for SVC-VRF-1-IN 64A and by which forwarding unit 54 can send service traffic to service node 10A. IIF 66B is an interface to an attachment circuit 68B for SVC-VRF-1-OUT 64B and by which forwarding unit 54 can receive service traffic from service node 10A. Forwarding unit 54 is also configured with SVC-VRF-2-IN 70A having OIF 72A and SVC-VRF-2-OUT 70B having IIF 72B. OIF 72A is an interface to an attachment circuit 74A for SVC-VRF-2-IN 70A and by which forwarding unit 54 can send service traffic to service node 10B. IIF 72B is an interface to an attachment circuit 74B for SVC-VRF-2-OUT 70B and by which forwarding unit 54 can receive service traffic from service node 10B. VRFs 64, 70 may alternatively be referred to as "service VRFs" in that they are usable by network device 40 for exchanging traffic with service nodes 10. Attachment circuits 68, 74 may alternatively be referred to as "VRF attachment circuits."

Each of attachment circuits 68, 74 may represent a physical and/or virtual circuit attaching a service node 10 to one of VRFs 64, 70 and may be, for example, a Frame Relay data link connection identifier, an asynchronous transfer mode (ATM) Virtual Path Identifier (VPI)/Virtual Channel Identifier (VCI), an Ethernet port, a VLAN, a Point-to-Point Protocol (PPP) connection on a physical interface, a PPP session from an L2 Tunneling Protocol (L2TP) tunnel, or a Multiprotocol Label Switching (MPLS) Label Switched Path (LSP), a Generic Route Encapsulation (GRE) tunnel, or another interface with bridged encapsulation. Attachment circuits 68, 74 may each comprise a direct link or an access network. In at least some examples, packets transported via attachment circuit 68, 74 include respective MPLS labels identifying the attachment circuit and the associated VRF, in accordance with RFC 4364.

Forwarding unit 54 is further configured with services list 60 specifying an ordered list of services 62A-62B that defines a set of service nodes 10 as a service chain for application to at least one packet flow received by network device 40. Services list 60 specifies the services as a list of respective VRF names that identify VRFs 64, 70 with which network device 40 exchanges services traffic with the corresponding service nodes 10. Service 62A specifies "SVC-VRF-1" identifying VRFs 64 for exchanging service traffic with service node 10A, and service 62B specifies "SVC-VRF-2" identifying VRFs 70 for exchanging service traffic with service node 10B. In this way, forwarding unit 54 is configured to stitch together a service chain made from service node 10A to service node 10B. Services 62 may identify VRFs using strings, as in the example of FIG. 2, or by another means.

Network device 40 receives packets for packet flow 80 and directs the packets along the service chain defined by services list 60. Forwarding unit 54 includes lookup module 56, which is configured to determine a next service 62 in the ordered services list 60 for application to service traffic based on the VRF with which the network device 40 receives the traffic.

In the illustrated example, after directing packets of packet flow 80 toward service node 10A via OIF 66A for attachment circuit 68A for application of at least one service by service node 10A, forwarding unit 54 receives the packets from service node 10A via IIF 66B for attachment circuit 68B. IIF 66B is associated with SVC-VRF-1-OUT. Based on an identifier for IIF 66B, such as an index value or string, lookup module 56 determines service 62B is the next service for the packets of packet flow 80 according to the ordering of the services list 60. In other words, because IIF 66B is associated with SVC-VRF-1-OUT 64B for "SVC-VRF-1" of service 62A and associated packets received with IIF 66B (and attachment circuit 68A) with SVC-VRF-1-OUT 64B, lookup module 56 is configured to determine, based on IIF 66B, the next service to applied after service 62A, i.e., service 62B.

Accordingly and because attachment circuits 68B, 74A are both located on network device 40 and associated with respective VRFs SVC-VRF-1-OUT 64B, SVC-VRF-2-IN 70A, forwarding unit 54 forwards packets of packet flow 80 received on IIF 66B using SVC-VRF-2-IN 70A, which is configured to forwards the packets of packet flow 80 via OIF 72A for attachment circuit 74A to service node 10B. The forwarding unit 54 thus identifies the VRF name from the IIF (associated with received packets as a packet property and in some cases included in the switch fabric header) on which the packet arrives and steers to the next VRF name index of the service chain list defined by services list 60. In this way, network device 40 is configured to steer service traffic to service nodes 10 according to a service chain defined by services list 60.

Figure 3:
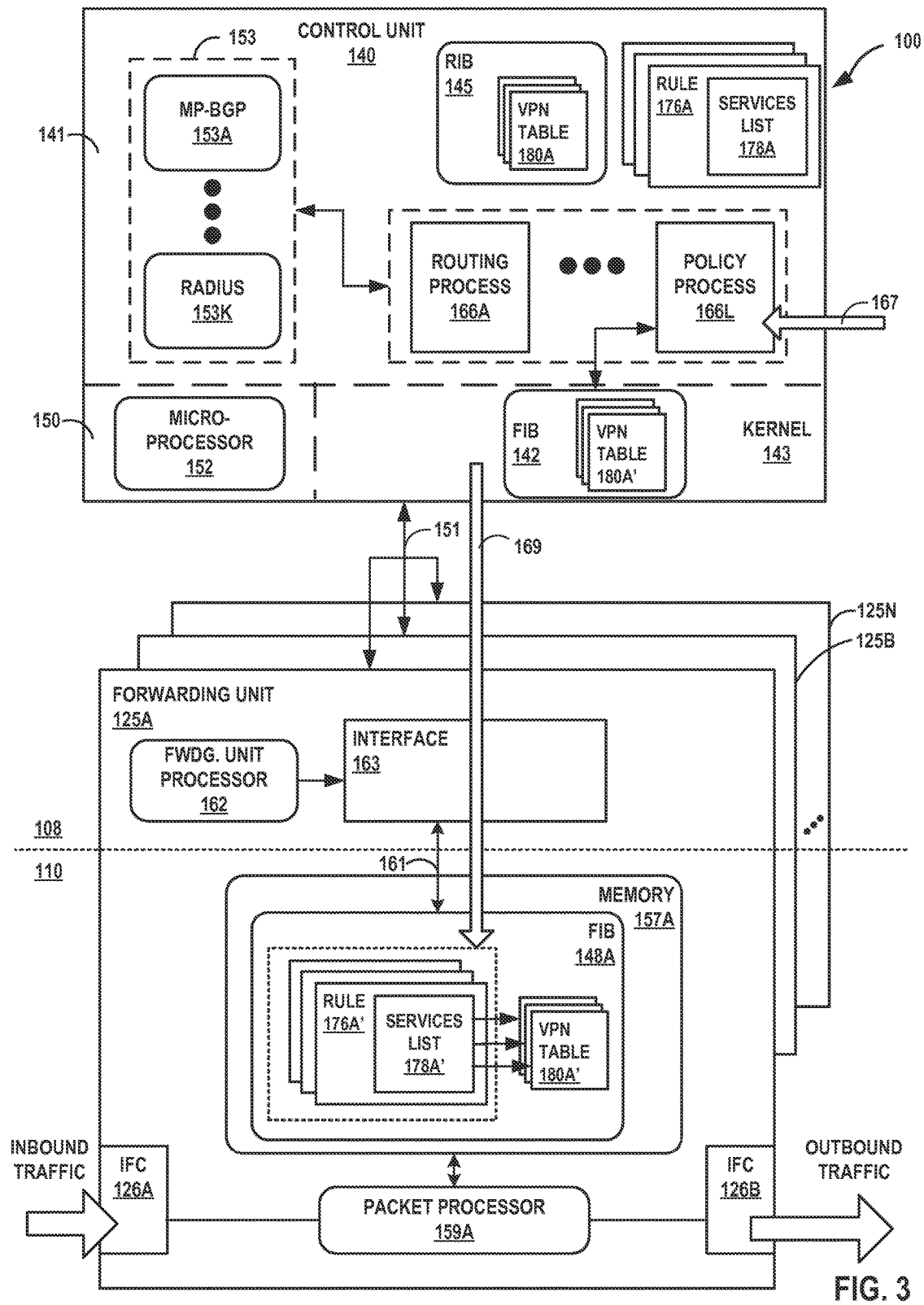
FIG. 3 is a block diagram illustrating, in detail, components of an example network device that dynamically stitches a service chain defined by an ordered list of services according to techniques described herein.

FIG. 3 is a block diagram illustrating, in detail, components of an example network device that dynamically stitches a service chain defined by an ordered list of services according to techniques described herein. Network device 100 illustrated in FIG. 3 may represent an example instance of service control gateway 20 of FIG. 1 or network device 40 of FIG. 2.

In this example, control unit 140 includes a combination of hardware and software that provides a control plane 108 operating environment for execution of various user-level host processes 166A-166L (collectively, "host processes 166") executing in user space 141. By way of example, host processes 166 may include a command-line interface and/or graphical user interface process 166L to receive and respond to administrative directives in accordance with one or more of protocols 153, a routing process 166A to execute one or more routing protocols of protocols 153 including Multi-protocol Border Gateway Protocol (MP-BGP) 153A, a policy process to execute one or more policy interface protocols of protocols 153 such as RADIUS 153K, and so forth. Control unit 140 may provide routing plane, service plane, and management plane functionality for network device 100.

Host processes 166 execute on and interact with kernel 143, which provides a run-time operating environment for user-level processes. Kernel 143 may represent, for example, a UNIX operating system derivative such as Linux or Berkeley Software Distribution (BSD). Kernel 143 offers libraries and drivers by which host processes 166 may interact with the underlying system. Hardware environment 150 of control unit 140 includes microprocessor 152 that executes program instructions loaded into a main memory (not shown in FIG. 3) from a storage device (also not shown in FIG. 3) in order to execute the software stack, including both kernel 143 and user space 141, of control unit 140. Microprocessor 152 may represent one or more general- or special-purpose processors such as a digital signal processor (DSP), an application-specific integrated circuit (ASIC), a field programmable gate array (FPGA), or any other equivalent logic device. Accordingly, the terms "processor" or "controller," as used herein, may refer to any one or more of the foregoing structures or any other structure operable to perform techniques described herein.

In this example, routing process 166A executes one or more interior and/or exterior routing protocols, including MP-BGP 153A, to exchange routing information with other network devices and store received routing information in routing information base 145 ("RIB 145"). RIB 145 may include information defining a topology of a network, including one or more routing tables, link-state databases, and/or traffic engineering databases. RIB 145 includes multiple VPN tables 180A-180M for corresponding VRFs configured for network device 100. The VRFs may define service topologies for multiple different service nodes, as described above with respect to FIGS. 1-2.

Routing process 166A resolves the topology defined by routing information in RIB 145 to select or determine one or more active routes through the network and then installs these routes to forwarding information base 142 ("FIB 142"), which is stored by kernel 143 that is responsible for synchronizing the FIB 142 (the master copy of the network device 100 FIB) with FIBs 148A-148N on respective forwarding units 125A-125N. In some cases, FIB 142 includes a separate FIB copy corresponding to each of FIBs 148A-18N. FIB 142 may alternatively be referred to as a "software FIB" or "kernel FIB," for the FIB 142 is managed by software components of the control plane, including kernel 143. Each of FIBs 148A-148N may alternatively referred to as a "hardware FIB," in that it is stored to memory accessible to a hardware-based packet processor 159A.

In some cases, FIB 142 may be generated and managed by user space processes, e.g., routing process 166A and policy process 166L, which may communicate forwarding structures to kernel 143 by a socket or other communication channel. Typically, processes 66 generates forwarding structures of FIB 142 to include radix or other lookup trees to map packet information (e.g., header information having destination information and/or a label stack) to other forwarding structures or to next hop devices and ultimately to interface ports of interface cards associated with respective forwarding units 125A-125N. In addition to generating and providing lookup data structures such as the aforementioned radix or lookup tree, processes 66 may generate and provide next hop instructions for installation to FIB 142 and eventual provisioning to FIBs 148A-148N.

Network device 100 also includes a plurality of forwarding units 125A-125N (collectively, "forwarding units 125") and a switch fabric (not shown) that together provide the data (or "forwarding") plane 110 for forwarding network traffic. Forwarding units 125 connect to control unit 140 in this example by communication links 151, which may represent an Ethernet network.

Each of forwarding units 125 may include substantially similar components performing substantially similar functionality, said components and functionality being described hereinafter primarily with respect to forwarding unit 125A illustrated in detail in FIG. 3. Forwarding unit 125A receives and sends network packets via interfaces of interface cards (IFCs) 126A, 126B of forwarding unit 125A. Forwarding unit 125A also includes hardware-based packet processor 159A and memory 157A, which together represent hardware or a combination of hardware and software that provide high-speed forwarding of network traffic, as described in further detail below. Likewise, forwarding unit 125B includes packet processor 159B and memory 157B, and so on. Each of forwarding units 215 includes an instance of forwarding unit processor 162 and interface 163. Forwarding unit 125A may include multiple packet processors 159A that provide a distributed data plane 110 in cooperation with other packet processors 159 on other forwarding units 125. In some examples, one or more of forwarding units 125 may each include at least one packet processor substantially similar to packet processor 159. Example instances of forwarding unit 125A may include flexible programmable integrated circuit (PIC) concentrators (FPCs), dense port concentrators (DPCs), and modular port concentrators (MPCs). In some instances, forwarding units 125 may or include represent line cards.

Each of IFCs 126A, 126B may include interfaces for various combinations of layer two (L2) technologies, including Ethernet, Gigabit Ethernet (GigE), and Synchronous Optical Networking (SONET) interfaces located on a PIC (not shown) of forwarding unit 125A, for instance. In various aspects, each of forwarding units 125 may include more or fewer IFCs. In some examples, each of packet processors 159 is associated with different IFCs of the forwarding unit on which the forwarding component is located. The switch fabric (again, not shown) connecting forwarding units 125 provides a high-speed interconnect for forwarding incoming transit network packets to the selected one of forwarding units 125 for output over a network interface of an IFC 126 of the selected forwarding unit.

Network device 100 may in some instances represent a multi-chassis router, and the switch fabric may include a multi-stage switch fabric, such as a 3- or 5-stage Clos switch fabric, that relays packet-switched communications and circuit-switched communications between the routing nodes of the multi-chassis router via optical interconnects using multiplexed communications. An example multi-chassis router that employs optical interconnects using multiplexed communications is described in U.S. Pat. No. 8,050,559, entitled MULTI-CHASSIS ROUTER WITH MULTIPLEXED OPTICAL INTERCONNECTS, issued Nov. 1, 2011, the entire contents of which being incorporated by reference herein.

Forwarding units 125A-125N of network device 100 demarcate control plane 8 and data plane 10 of network device 100. That is, forwarding unit 125A performs functions of both control plane 108 and data plane 110. In general, packet processor 159A and IFCs 126A, 126B implement data plane 110 for forwarding unit 125A, while forwarding unit processor 162 (illustrated as "fwdg. unit processor 162") executes software that implements portions of control plane 108 within forwarding unit 125A. Control unit 140 also implements portions of control plane 108 of network device 100. Forwarding unit processor 162 of forwarding unit 125A manages packet processor 159A and executes instructions to provide an interface 163 to control unit 140 receive process inter-plane communications and handle host-bound or other local/exception network packets. Interface 163 may further provide an interface by which forwarding unit 125A receives at least part of FIB 142 for installation to memory 157A as FIB 148A and maintains FIB 148A. Forwarding unit processor 162 may represent a general- or special-purpose processor, microprocessor, or controller capable of executing instructions. Forwarding unit processor 162 may execute a microkernel for forwarding unit 125A.

Memory 157A of forwarding unit 125A represents one or more computer-readable storage media, such as one or more instances of Random Access Memory (RAM), e.g., Static RAM (SRAM), Dynamic RAM (DRAM), and/or Reduced Latency DRAM (RLDRAM). In some examples, packet processor 159A and memory 157A may represent or include a Content Addressable Memory (CAM) such as Tertiary CAM (TCAM). Although illustrated as separate from packet processor 159A, at least a portion of memory 157A may in some cases be internal memory for the packet processor 159A.

Memory 157A stores FIB 148A including VPN tables 180' and rules 176' received by interface 163 from control plane 108. In the illustrated example, kernel 143 installs to memory 157A at least a part of FIB 142 to FIB 148A including VPN tables 180' and rules 176'.

Packet processor 159A may represent a packet-forwarding integrated circuit (IC), e.g., one or more programmable ASICs or ASIC-based packet processors, that processes network packets by performing a series of operations on each packet over respective internal packet forwarding paths as the packets traverse the internal architecture of network device 100. Packet processor 159A processes packets in accordance with next hop instructions. A next hop is a data structure stored to FIB 148A that either contains the final result of packet processing for a packet or acts as a link to another lookup for the same packet.

Packet processor 59A accesses next hops stored to FIB 148A that, when executed, cause packet processor 159A to examine the contents of each packet (or another packet property, e.g., incoming interface (IIF) on which the network device received the packet) and on that basis make forwarding decisions, apply filters, and/or perform accounting, management, traffic analysis, and load balancing, for example. In one example, packet processor 159A stores next hops as next hop data chained together (or otherwise arranged) as a series of next hops along an internal packet forwarding path for the network device 100. The result of packet processing determines the manner in which a packet is forwarded or otherwise processed by packet processors 159 from its input interface on one of forwarding units 125 to its output interface on one of forwarding units 125 (the same forwarding unit 125 may have both the input and output interface for a given packet). Additional details regarding next hops and an example forwarding architecture are described in U.S. Pat. No. 7,215,637, "Systems and methods for processing packets," issued May 8, 2007; in PLATFORM-INDEPENDENT CONTROL PLANE AND LOWER-LEVEL DERIVATION OF FORWARDING STRUCTURES, U.S. application Ser. No. 12/266,298, filed Nov. 6, 2008; and in U.S. Pat. No. 8,806,058, issued Aug.

12, 2014, and entitled "PACKET FORWARDING PATH PROGRAMMING USING A HIGH-LEVEL DESCRIPTION LANGUAGE," each of which being incorporated herein by reference in its entirety.

In accordance with techniques described herein, policy process 166L receives a policy rule message 167 conforming to a policy protocol such as RADIUS 153K or Diameter. Policy rule message 167 includes a policy rule that specifies packet flow definition data for identifying one or more packet flows and further includes a services list that specifies an ordered list of services to apply to the one or more packet flows that match the packet flow definition data. Packet flow definition data may include, e.g., a service data flow (SDF) filter or traffic flow template (TFT) filter. Packet flow definition data may identify flows according to subscriber, according to application, or by other criteria. Policy process 166L stores the policy rule as one of policy rules 176, which may include PCC/ADC rules, for instance, in association with the services list stored as service lists 178. For instance, rule 176A includes services list 178A as the ordered list of services to apply to packet flow(s) matching the packet flow definition data for rule 176A.

Processes 166 install representations of rules 176 including services lists 178 and VPN tables 180 to FIB 142. Kernel 143 downloads the FIB 142 to the hardware FIBs 148 of forwarding units 125. VPN tables 180A' may in some cases represent lookup trees (e.g. Radix trees) or lookup tables. Packet processors 159 of distributed forwarding units 125 process packets received on incoming interfaces and process the packets by determining, based on an incoming interface (e.g., an attachment circuit for a VRF/VPN table 180), a next service in services list 178' for application to the packets. In response to determining the next service, the packet processors 159 forward the packets using the VPN table 180A' that is an "in" VRF for the next service. In this way, network device 100 is configured to steer service traffic to services according to service chains defined by services lists 178 dynamically provided by, e.g., a policy control server to network device 100.

Figure 4A:
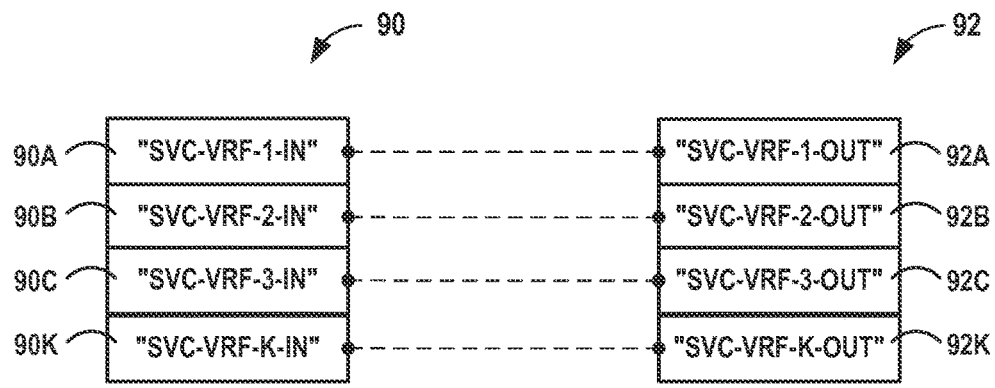
FIGS. 4A-4B are block diagrams illustrating example services lists for defining a service chain according to techniques described herein.
Figure 4B:
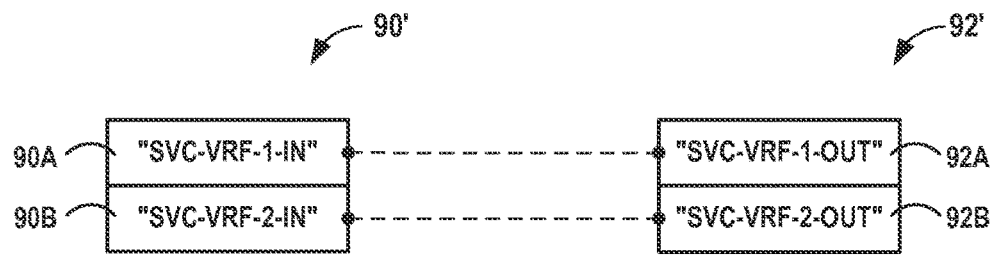

FIGS. 4A-4B are block diagrams illustrating example services lists for defining a service chain according to techniques described herein. In these examples, lists of services are bifurcated into corresponding uplink service lists and a downlink service lists. FIG. 4A illustrates uplink services list 90 and downlink services list 92. Uplink services list 90 includes an ordered list of VRF names 90A-90K that correspond to respective start points of services in a service chain. Downlink services list 92 includes an ordered list of VRF names 92A-92K that correspond to respective end points of services in the service chain. For example, VRF name 90A ("SVC-VRF-1-IN") identifies a service VRF-in that includes an attachment circuit for sending service traffic to a service, and VRF name 92A ("SVC-VRF-1-OUT") identifies a service VRF-out that includes an attachment circuit for receiving service traffic from the same service (e.g., "service 1").

K is a variable for the number of services in the service chain. If K>4, uplink services list 90 and downlink services 92 will include additional services between 90C, 92C and 90K, 92K. The number of services may be any non-negative integer.

Uplink services list 90 may be a value portion of a Service-List-UpLink attribute-value pair (AVP) (or Vendor-Specific Attribute (VSA)) for communication via a policy protocol (e.g., RADIUS) on a policy interface (e.g., Sd or Gx). In such instances, the Service-List-Uplink AVP may be provisioned with an ordered list of VRF names configured on a service control gateway (or other network device) and representing the start point of each service in a service chain. This Service-List-Uplink AVP may be provisioned per rule in the service control gateway or other network device operating according to techniques described herein, via PCRF dynamic Gx or Static Gx policy type, or using another policy protocol and interface (e.g., ADC and Sd).

Downlink services list 92 may be a value portion of a Service-List-DownLink AVP or VSA for communication via a policy protocol on a policy interface. In such instances, the Service-List-Downlink AVP may be provisioned with an ordered list of VRF names configured on a service control gateway (or other network device) and representing the end point of each service in a service chain. This Service-List-DownLink AVP may be provisioned per rule in a service control gateway or other network device operating according to techniques described herein, via PCRF dynamic Gx or Static Gx policy type, or using another policy protocol and interface (e.g., ADC and Sd).

A subscriber created on a service control gateway will associate the uplink services list 90 and downlink services list 92 in the action for the rule (e.g. PCC-action for a PCC rule) to steer the traffic towards the VRF names in the order received. The data traffic will be steered into the first VRF provisioned in the Service-List and upon return from the first service into the second VRF in the service-list and so on till all the service in the service-list are exhausted in the uplink and downlink directions corresponding to the uplink services list 90 and downlink services list 92, respectively. The service control gateway may identify the VRF name from the ingress iif on which the packet arrives and steer to next VRF name index of the service chain list. The iif is a packet property may be included in a fabric header for a packet/cell received by the service control gateway.

In the example of FIG. 4A, in the uplink direction (e.g., from subscriber devices or toward a PDN), uplink packets ingressing from SVC-VRF-1-OUT (92A) at the service control gateway will be steered to SVC-VRF-2-IN (90B) and uplink packets ingressing at SVC-VRF-2-OUT (92B) will be steered to SVC-VRF-2-IN (90C), and so on until service control gateway forwards uplink packets ingressing at SVC-VRF-K-OUT (92K) using the default routing table.

In the downlink direction (e.g., toward subscriber devices or away from a PDN), downlink packets ingressing at SVC-VRF-K-OUT (92K) will be steered to SVC-VRF-3-IN (90C) and downlink packets ingressing at SVC-VRF-3-OUT (92C) will be steered to SVC-VRF-2-IN (90B), and so on until service control gateway forwards downlink packets ingressing at SVC-VRF-1-OUT (92A) using the default routing table (or "default VRF").

A service control gateway may determine whether a packet is an uplink packet or a downlink packet based on a destination network address of the packet and routes installed to the VRFs that specify different actions for packets having different destination network addresses.

Subsequent to the service control gateway (or other network device) being provisioned with a rule that is associated with uplink services list 90 and downlink services list 92, a policy control server may dynamically modify the rule to provision the service control gateway with a modified uplink services list 90' and a modified downlink services list 92' for a modified services list, as illustrated in FIG. 4B. The modified services list is pared to include two services in this example. In other examples, services lists may be dynamically modified by the policy control server to modify the services applied, modify the order of the services, add or remove services, and so forth.

Service control gateway receives and installs the modified rule including the modified uplink services list 90' and a modified downlink services list 92' and steers traffic that matches the rule according to the modified service chain defined by the modified uplink services list 90' and a modified downlink services list 92'. Using these techniques, a policy control server or other administrative entity or device may dynamically control the services applied to subscriber and/or application traffic, including by modifying the services applied while a subscriber session or application is in progress.

Figure 5A:
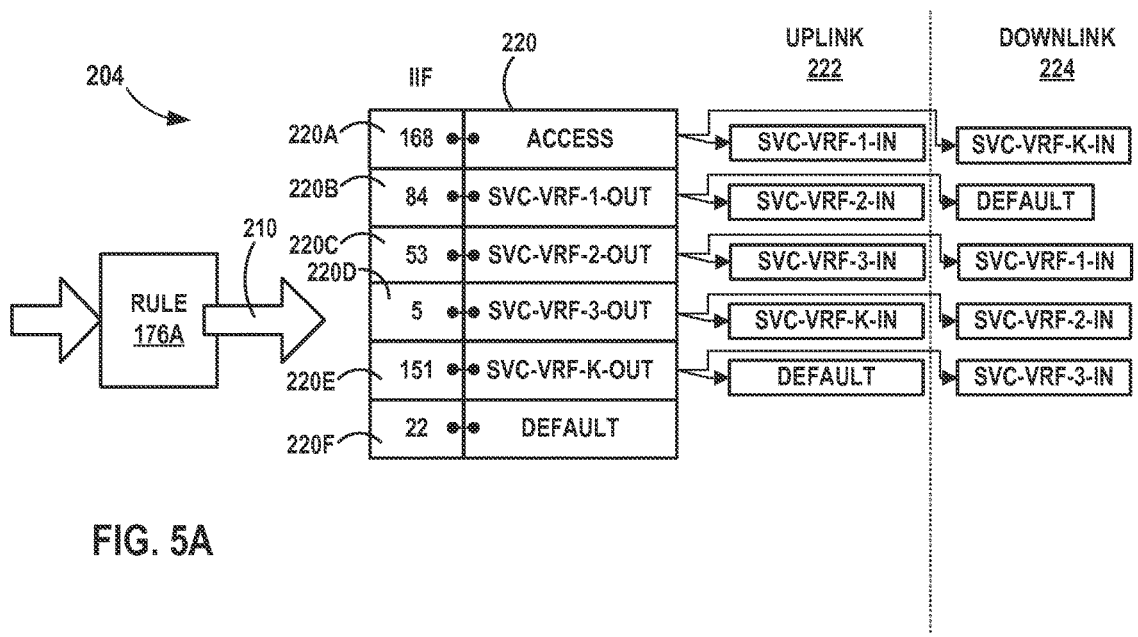
FIGS. 5A-5B are block diagrams illustrating example internal packet processing paths executable by a packet processor for dynamic service chaining according to techniques described herein.
Figure 5B:
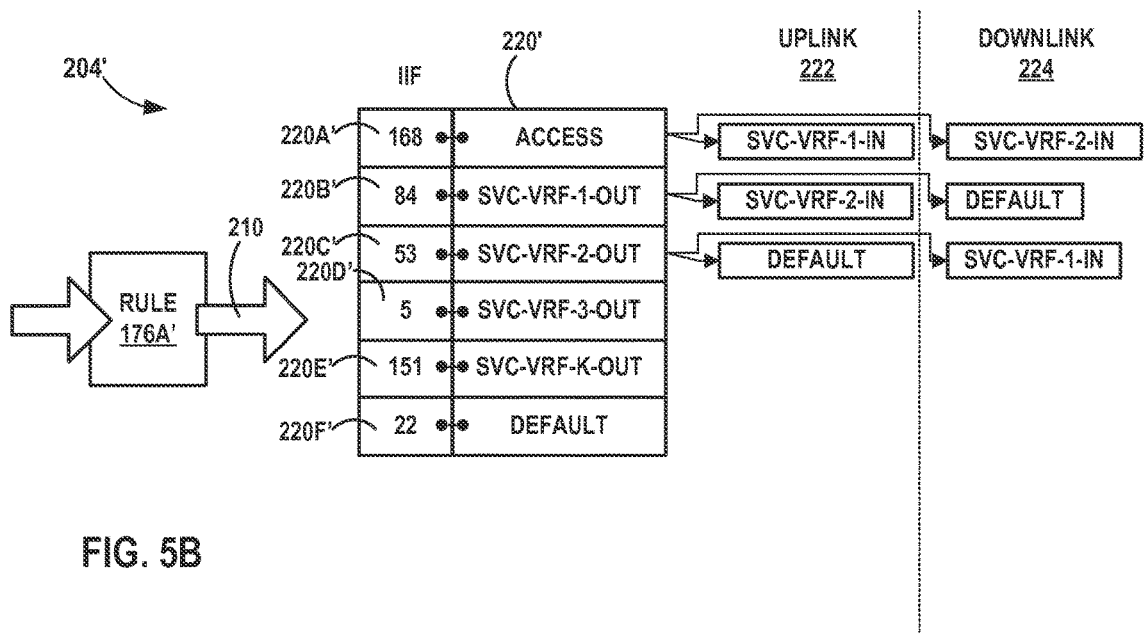

FIGS. 5A-5B are block diagrams illustrating example internal packet processing paths executable by a packet processor for dynamic service chaining according to techniques described herein. Internal packet processing path 204 includes forwarding lookup structures and next hop instructions and may be defined within one or more hardware FIBs of one or more forwarding units of a network device, such as FIBs 148 of forwarding units 125 of FIG. 3.

As illustrated in FIG. 5A, a packet processor executes packet processing path 204 to match packets of a packet flow 210 to rule 176A of rules 176, and to steer the matching packets along a service chain that is (1) dynamically provisioned within the network device with uplink services list 90 and downlink services list 92, and (2) implemented in a hardware FIB by a combination of lookup data structures and next hop instructions. Specifically, path 204 includes lookup table 220 that keys to IIFs of received packets (the IIFs associated with various VRFs configured on the network device) and resolves to a forwarding table. Lookup table 220 includes entries 220A-220F (collectively, "entries 220") each having an IIF key value and resolving to different forwarding table that is dependent on whether the received packets having the IIF key value are uplink packets or downlink packets.

For instance, packets received on an IIF identified by value '168' are received with an access VRF (e.g., an access VRF connecting gateway 8 to service control gateway 20) and key to entry 220A. For uplink packets 222, entry 220A resolves to the "SVC-VRF-1-IN" VRF, which is an entry point for a service and causes the packet processor to forward the matching uplink packets 222 to a service node providing the service and having a destination route installed in the "SVC-VRF-1-IN" VRF in the network device. For downlink packets 224, entry 220A resolves to the "SVC-VRF-K-IN" VRF, which is an entry point for a service and causes the packet processor to forward the matching downlink packets 224 to a service node providing the service and having a destination route installed in the "SVC-VRF-K-IN" VRF in the network device.

To take another example, packets received on an IIF identified by value '53' are received with a "SVC-VRF-2-OUT" VRF and key to entry 220c. For uplink packets 222, entry 222 resolves to the "SVC-VRF-3-IN" VRF, which is an entry point for a service and causes the packet processor to forward the matching uplink packets 222 to a service node providing the service and having a destination route installed in the "SVC-VRF-3-IN" VRF configured in the network device. For downlink packets 224, entry 220C resolves to the "SVC-VRF-1-IN" VRF, which is an entry point for a service and causes the packet processor to forward the matching uplink packets 222 to a service node providing the service and having a destination route installed in the "SVC-VRF-1-IN" VRF configured in the network device. Each of the VRFs and interfaces illustrated in FIGS. 5A-5B may include a forwarding table having routes that key to destination network addresses of packets and specify one or more actions for matching packets, e.g., forwarding the matching packets via an OIF for an attachment circuit to a service node.

By processing uplink packets 222 and downlink packets 224 based on respective IIFs on which the network device receives the packets and resolving to next hops according to lookup table 220, the packet processor is able to determine the next service in the uplink services list and downlink services list (respectively), and so dynamically stitch together an uplink service chain for uplink packets 222 and a downlink service chain for downlink packets 224. In some examples, the network device implements at least one of an uplink service chain and a downlink service chain.

FIG. 5B illustrates packet processing path 204' dynamically modified from packet processing path 204 to implement the modified uplink services list 90' and modified downlink services list 92' of FIG. 4B, and received by the network device. The packet processor executes packet processing path 204' to match packets of a packet flow 210 to modified rule 176A' of rules 176, and to steer the matching packets along a modified service chain that is (1) dynamically provisioned within the network device with uplink services list 90' and downlink services list 92', and (2) implemented in a hardware FIB by a combination of lookup data structures and next hop instructions. In this way, the network device may be dynamically provisioned with a list of services to apply to packets flows.

Figure 6A:
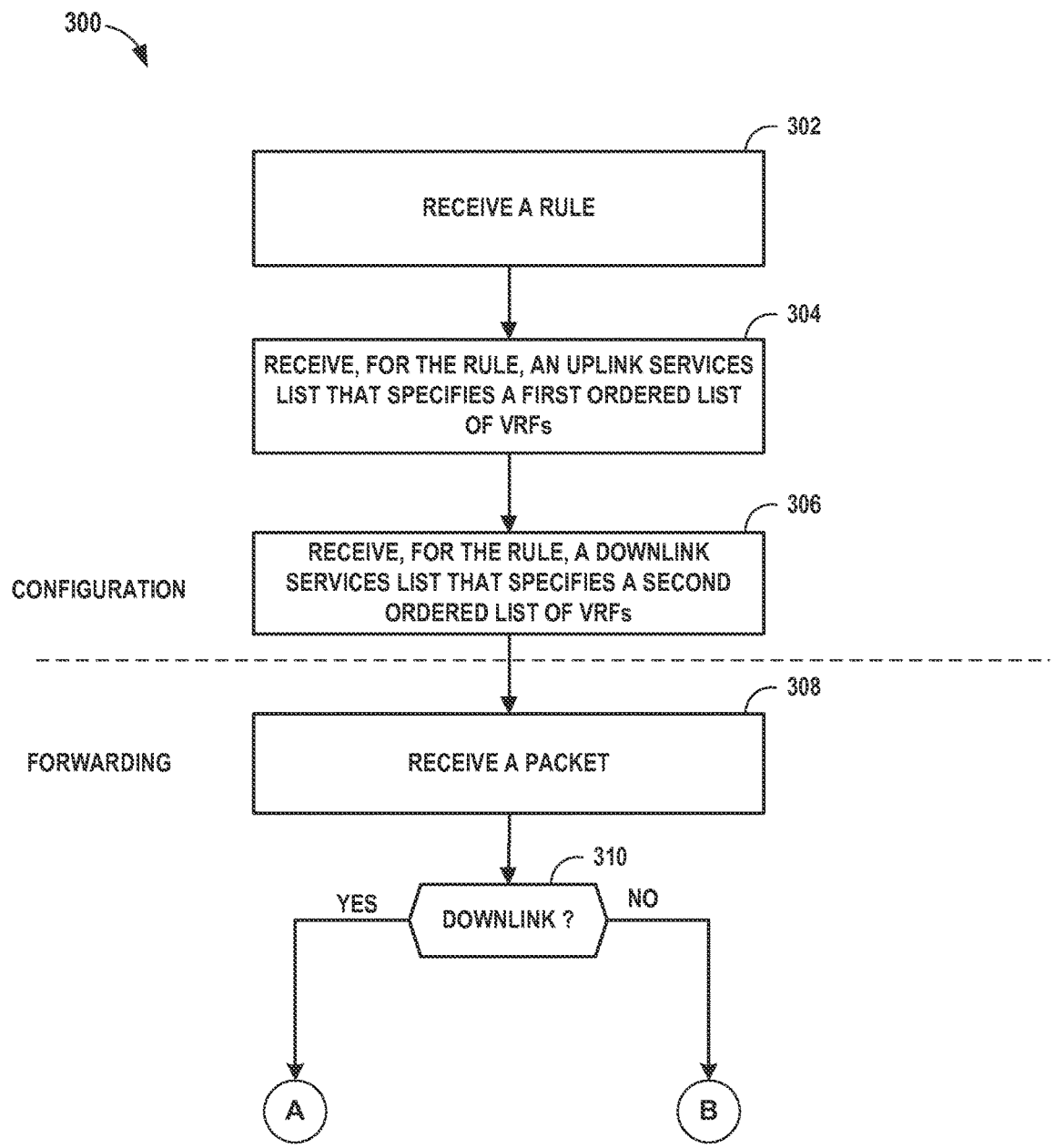
FIGS. 6A-6C depict a flowchart illustrating an example mode of operation for a network device according to techniques described herein.
Figure 6B:
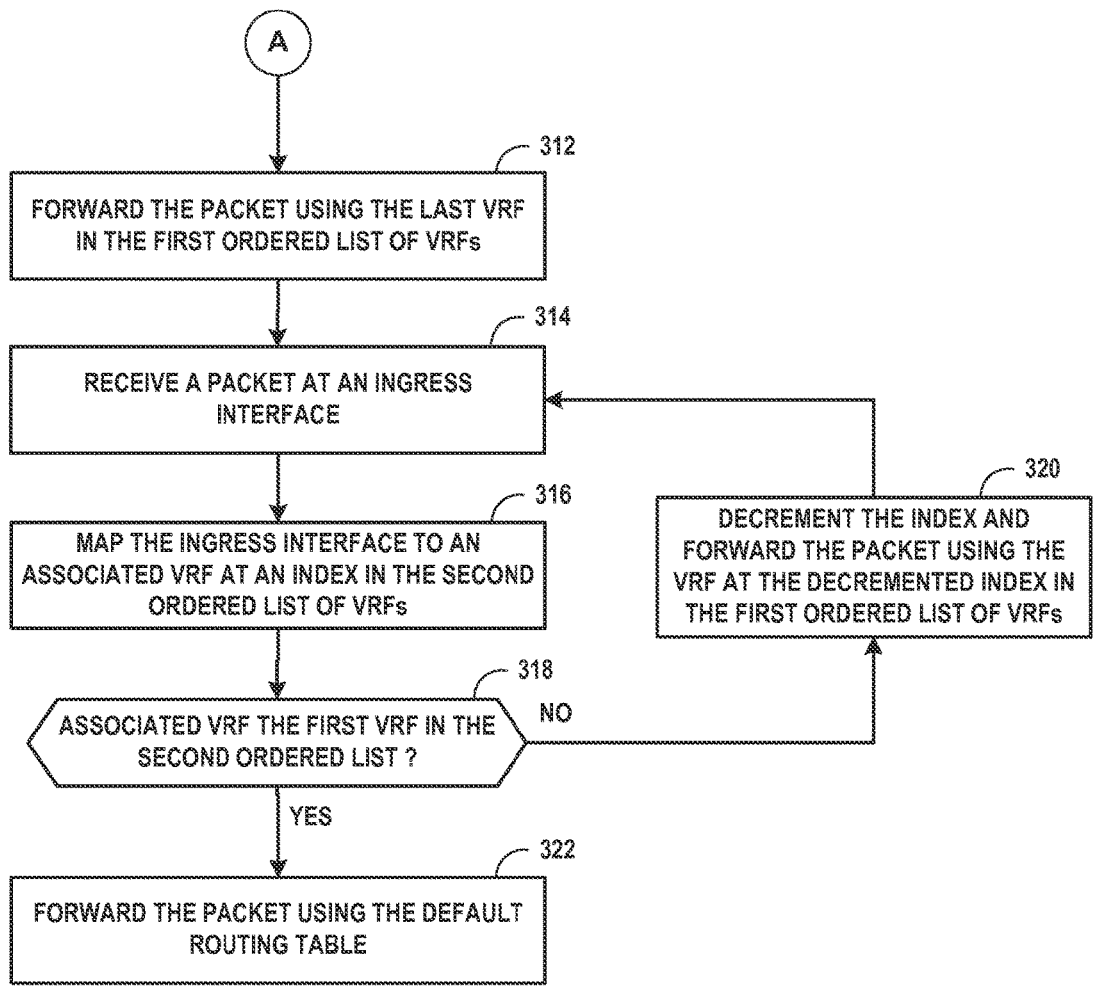
Figure 6C:
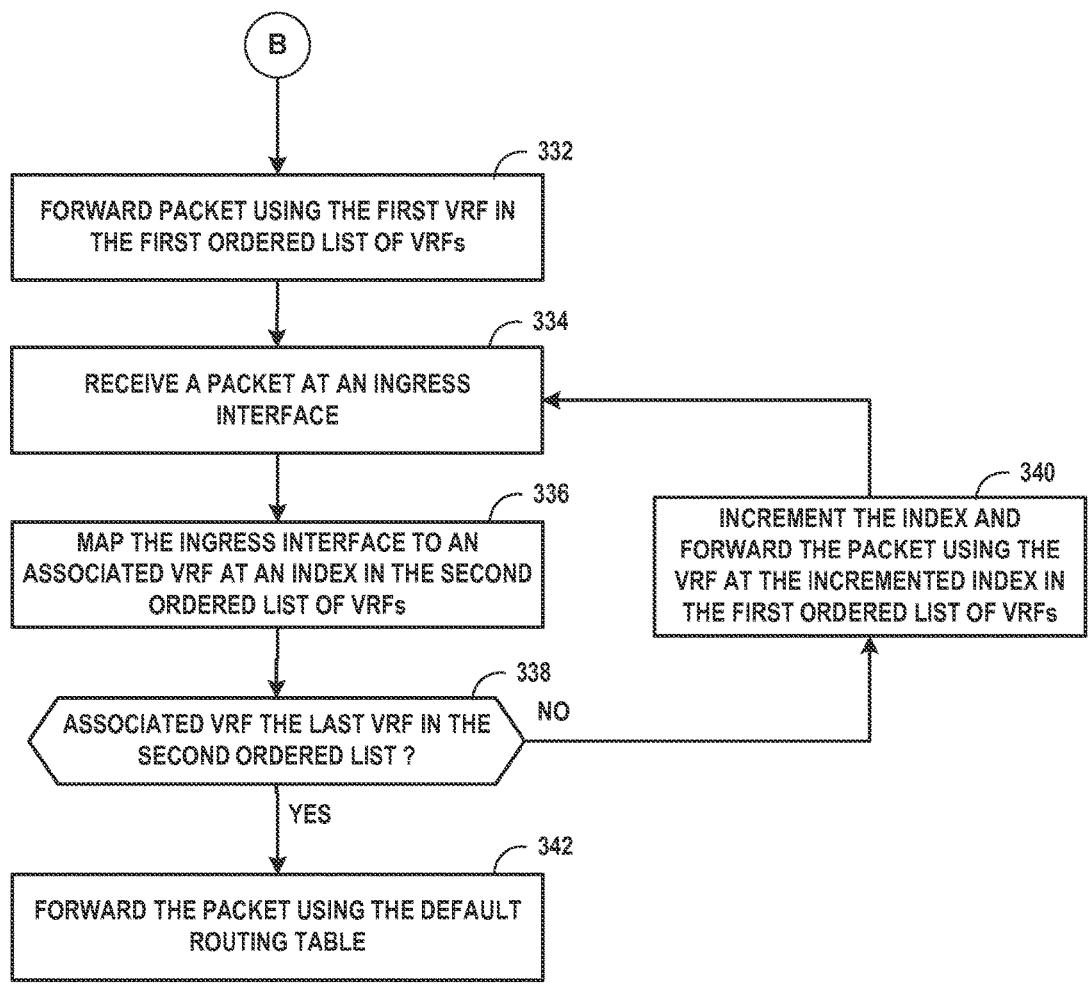

FIGS. 6A-6C depict a flowchart illustrating an example mode of operation for a network device according to techniques described herein. The mode of operation is described with respect to service control gateway 30 of FIG. 1 and uplink services list 90 and downlink services list 92 of FIG. 4A.

Service control gateway 30 receives configuration information from a policy control server. Specifically, service control gateway 30 receives a policy rule (302) as well as an uplink services list 90 for the rule (304) and a downlink services list 92 for the rule (306). Uplink services list 90 specifies a first ordered list of VRFs, and downlink services list 92 specifies a second ordered list of VRFs. Service control gateway 30 may install the rule and the services lists to a forwarding plane.

Service control gateway 30 subsequently receives a packet (308). If the packet is a downlink packet (YES branch of 310), service control gateway 30 forwards the packet to a service node using the last VRF in the first ordered list of VRFs specified by the uplink services list 90 (312). Service control gateway 30 receives a packet at an incoming interface (314) and maps the incoming interface to an associated VRF at an index in the second ordered list of VRFs (316). Packets received at step 314 may differ from the packets sent from the service control gateway 30 due to the application of services at the service nodes. If the associated VRF is the first VRF in the second ordered list of VRFs (YES branch of 318), service control gateway 30 forwards the packet using the default routing table (322). Otherwise (NO branch of 318), service control gateway 20 decrements the index and forwards the packet to the next service node in the chain using the VRF at the decremented index in the first ordered list of VRFs (320).

If the packet is an uplink packet (NO branch of 310), service control gateway 20 forwards the packet to a service node using the first VRF in the first ordered list of VRFs specified by the uplink services list 90 (332). Service control gateway 20 receives a packet at an incoming interface (334) and maps the incoming interface to an associated VRF at an index in the second ordered list of VRFs (336). Packets received at step 334 may differ from the packets sent from the service control gateway 20 due to the application of services at the service nodes. If the associated VRF is the last VRF in the second ordered list of VRFs (YES branch of 338), service control gateway 20 forwards the packet using the default routing table (342). Otherwise (NO branch of 338), service control gateway 20 increments the index and forwards the packet to the next service node in the chain using the VRF at the incremented index in the first ordered list of VRFs (340).

Figure 7:
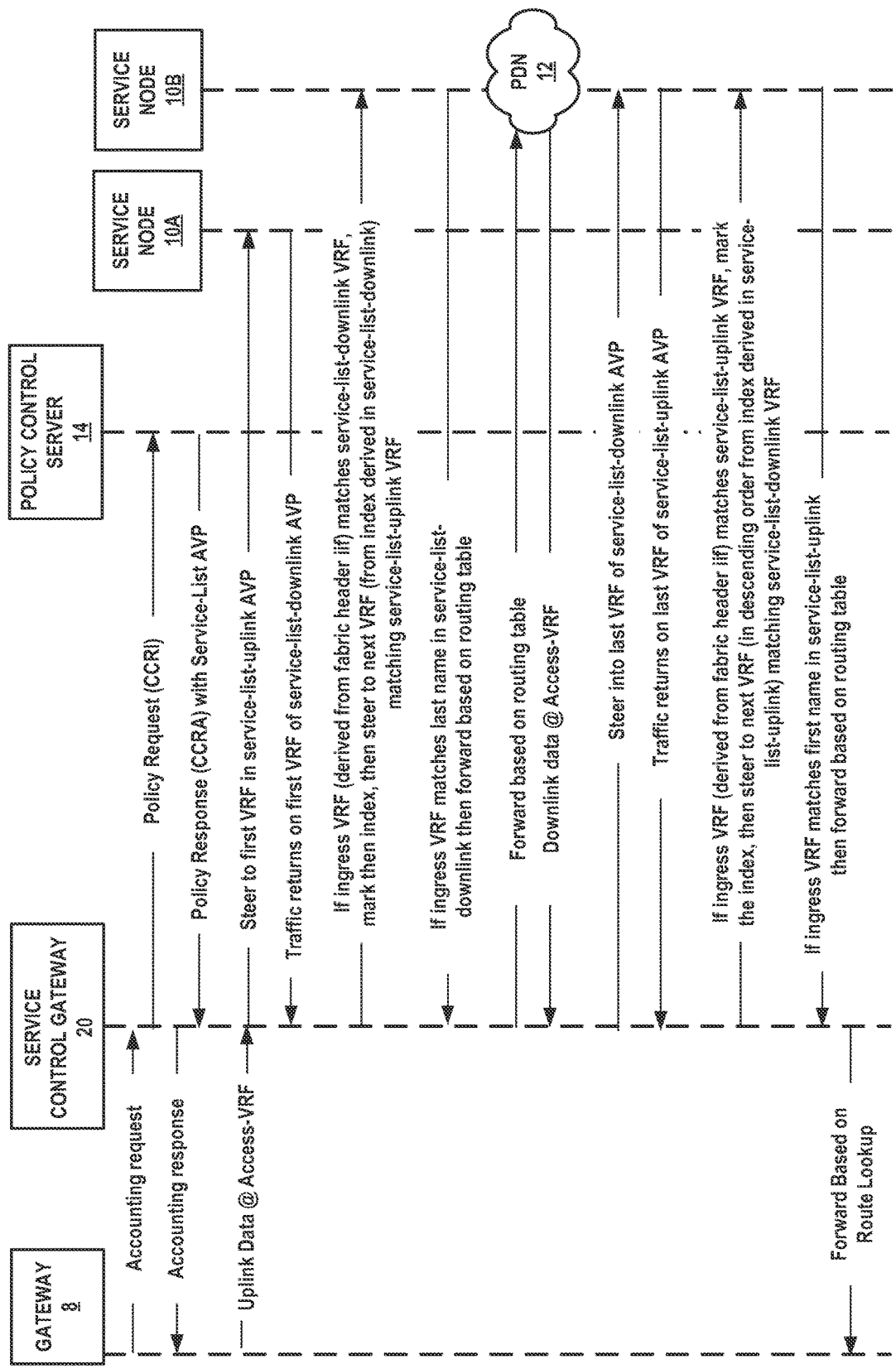
FIG. 7 is a conceptual diagram illustrating a control flow and packet flow among network elements of a service provider network according to a dynamically provisioned service chain, in accordance with techniques described herein.

FIG. 7 is a conceptual diagram illustrating a control flow and packet flow among network elements of a service provider network according to a dynamically provisioned service chain, in accordance with techniques described herein. With regard to the control flow in this example, gateway 8 issues a RADIUS or Diameter Accounting Request to service control gateway 20 to initiate policy provisioning for a subscriber device 16. Service control gateway 20 responds with a corresponding Accounting Response.

In addition, service control gateway 20 issues, to policy control server 14, a policy request for policies to be applied to traffic for the new subscriber or application (e.g., flows 27). The policy request in this example is a Diameter CCRI. Policy control server 14 sends a policy response, in this example a Diameter CCRA, to service control gateway 20.

The policy response includes an uplink services list specifying one or more "in" VRFs, as well as a downlink services list specifying one or more "out" VRFs. In this way, service control gateway 20 may be dynamically provisioned with a service chain 25. Service control gateway 20 stitches together the in VRFs and out VRFs in order to direct flows 27 along service chain 25. In FIG. 7, "service-list-uplink AVP" indicates the uplink service list, and "service-list-downlink AVP" indicates the downlink service list, both included as separate AVPs in the CCRA.

Service control gateway 20 receives uplink packets from gateway 8 via an access VRF. Service control gateway 20 steers the packets to VRF1_IN 26A ("first VRF in service-list-uplink AVP"), which forwards the traffic to service node 10A, which applies a first service. Service control gateway 20 receives the traffic back on an incoming interface for VRF1_OUT 26B ("first VRF in service-list-downlink AVP"). Service control gateway 20 maps the incoming interface for VRF2_OUT 26B to the next VRF, VRF1_IN 28A, and forwards the traffic accordingly to service node 10B, which applies a second service. Service control gateway 20 receives the traffic back on an incoming interface for VRF2_OUT 28B. Service control gateway 20 maps the incoming interface for VRF2_OUT 26B to the next VRF, which may be the default routing table. Service control gateway 20 outputs the packets according to the next VRF and a route lookup toward PDN 12.

For downlink packets received by service control gateway 20 via, e.g., an access VRF, service control gateway 20 may apply the uplink service list and downlink service list in a reverse ordering to apply a service chain that is a reverse of service chain 25.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various embodiments have been described. These and other embodiments are within the scope of the following examples.

What is claimed is:
1. A method comprising:
receiving, by a service control gateway, configuration data defining a plurality of virtual private network (VPN) routing and forwarding tables (VRFs);
receiving, by the service control gateway, a first ordered list of VRFs from the plurality of VRFs, wherein each VRF in the first ordered list of VRFs represents a start point of a corresponding service from a plurality of services including a first service and a second service;
receiving, by the service control gateway, a second ordered list of VRFs from the plurality of VRFs, wherein each VRF in the second ordered list of VRFs represents an end point of a corresponding service from the plurality of services;
receiving, by the service control gateway, a packet of a packet flow from a first service node that has applied the first service to the packet; and
sending, by the service control gateway based at least on the first ordered list and the second ordered list, the packet to a second service node that applies the second service.

2. The method of claim 1,
wherein receiving the packet comprises receiving, by the service control gateway via an incoming interface, the packet from the first service node that has applied the first service to the packet, and wherein sending the packet comprises sending, by the service control gateway based at least on the incoming interface, the packet to the second service node that applies the second service.

3. The method of claim 2, wherein sending the packet comprises:

mapping, by the service control gateway in response to receiving the packet via the incoming interface, an identifier for the incoming interface to the first service to identify the first service in the first ordered list of VRFs; and sending, by the service control gateway in response to identifying the first service and determining the second service is a next service in the second ordered list of VRFs, the packet to the second service node that applies the second service.

4. The method of claim 1, wherein the first ordered list of VRFs specifies a VRF for the first service and wherein the second ordered list of VRFs specifies a VRF for the second service, the method further comprising:

installing, to a forwarding plane of the service control gateway in response to receiving the first ordered list of VRFs and the second ordered list of VRFs, forwarding information that includes a mapping from an incoming interface associated with the VRF for the first service to the VRF for the second service, wherein receiving the packet comprises receiving, by the service control gateway via the incoming interface, the packet from the first service node that has applied the first service to the packet, and wherein sending the packet comprises sending, by the service control in accordance with the mapping, the packet to the second service node that applies the second service.

5. The method of claim 1, wherein receiving the packet comprises receiving, by the service control gateway via an incoming interface, the packet from the first service node that has applied the first service to the packet, the method further comprising:

determining, by the service control gateway in response to determining an associated VRF for the incoming interface, an index in the second ordered list of VRFs for the associated VRF, wherein the associated VRF is a VRF for the first service, wherein sending the packet comprises forwarding, by the service control gateway in response to incrementing the index and determining a next VRF at the incremented index in the first ordered list of VRFs, the packet using the next VRF, wherein the next VRF is a VRF for the second service.

6. The method of claim 1, wherein receiving the first ordered list of VRFs and the second ordered list of VRFs comprises receiving, by the service control gateway, a rule installation message comprising the first ordered list of VRFs and the second ordered list of VRFs.

7. The method of claim 6,
wherein the rule installation message comprises a Credit Control Answer message conforming to a Diameter protocol and extended to include:
an uplink attribute-value pair (AVP) comprising the first ordered list of VRFs; and
a downlink AVP comprising the second ordered list of VRFs.

8. The method of claim 6,
wherein the rule installation message further comprises a policy rule that specifies packet flow definition data, and
wherein sending the packet comprises applying, by the service control gateway in response to matching the packet to the packet flow definition data, the first ordered list of VRFs and the second ordered list of VRFs.

9. The method of claim 8,
wherein the policy rule comprises one of a Policy and Charging Control rule and an Application Detection and Control (ADC) rule.

10. The method of claim 1, further comprising:
generating, by the service control gateway based on the first ordered list of VRFs and the second ordered list of VRFs, a lookup table having a plurality of entries that map respective identifiers for a plurality of incoming interfaces of the service control gateway to respective VRFs of the second ordered list of VRFs,
wherein receiving the packet comprises receiving, by the service control gateway via an incoming interface associated with an identifier, the packet from the first service node that has applied the first service to the packet,
wherein sending the packet comprises:
determining, by the service control gateway based on the lookup table, the VRF of the second ordered list of VRFs that is mapped to the identifier associated with the incoming interface on which the packet was received; and
forwarding the packet using the VRF, wherein the VRF is a VRF for the second service.

11. A network device comprising:
at least one memory; and
processing circuitry operably coupled to the at least one memory, wherein the processing circuitry is configured to:
receive configuration data defining a plurality of virtual private network (VPN) routing and forwarding tables (VRFs);
receive a first ordered list of VRFs from the plurality of VRFs, wherein each VRF in the first ordered list of VRFs represents a start point of a corresponding service from a plurality of services including a first service and a second service;
receive a second ordered list of VRFs from the plurality of VRFs, wherein each VRF in the second ordered list of VRFs represents an end point of a corresponding service from the plurality of services;
receive a packet of a packet flow from a first service node that has applied the first service to the packet; and
send, based at least on the ordered list of services, the packet to a second service node that applies the second service.

12. The network device of claim 11, further comprising:
an incoming interface;
wherein to receive the packet the processing circuitry is configured to receive, via the incoming interface, the packet from the first service node that has applied the first service to the packet, and
wherein to send the packet the processing circuitry is configured to send, based at least on the incoming interface, the packet to the second service node that applies the second service.

13. The network device of claim 12, wherein to send the packet the processing circuitry is configured to:

map, in response to receiving the packet via the incoming interface, an identifier for the incoming interface to the first service to identify the first service in the first ordered list of VRFs; and send, in response to identifying the first service and determining the second service is a next service in the second ordered list of VRFs, the packet to the second service node that applies the second service.

14. The network device of claim 11, wherein the first ordered list of VRFs specifies a VRF for the first service and wherein the second ordered list of VRFs specifies a VRF for the second service, wherein the processing circuitry is configured to install, to the forwarding plane in response to receiving first ordered list of VRFs and the second ordered list of VRFs, forwarding information that includes a mapping from an incoming interface associated with the VRF for the first service to the VRF for the second service, wherein to receive the packet the processing circuitry is configured to receive, via the incoming interface, the packet from the first service node that has applied the first service to the packet, and wherein to send the packet the processing circuitry is configured to send, in accordance with the mapping, the packet to the second service node that applies the second service.

15. The network device of claim 11, wherein to receive the packet the processing circuitry is configured to receive, via an incoming interface, the packet from the first service node that has applied the first service to the packet, wherein the processing circuitry is further configured to determine, in response to determining an associated VRF for the incoming interface, an index in the second ordered list of VRFs for the associated VRF, wherein the associated VRF is a VRF for the first service, and wherein to send the packet the processing circuitry is further configured to forward, in response to incrementing the index and determining a next VRF at the incremented index in the first ordered list of VRFs, the packet using the next VRF, wherein the next VRF is a VRF for the second service.

16. The network device of claim 11, wherein to receive the first ordered list of VRFs and the second ordered list of VRFs the processing circuitry is further configured to receive a rule installation message comprising the first ordered list of VRFs and the second ordered list of VRFs.

17. The network device of claim 16, wherein the rule installation message comprises a Credit Control Answer message conforming to a Diameter protocol and extended to include:

an uplink attribute-value pair (AVP) comprising the first ordered list of VRFs; and a downlink AVP comprising the second ordered list of VRFs.

18. The network device of claim 16, wherein the rule installation message further comprises a policy rule that specifies packet flow definition data, and wherein to send the packet the processing circuitry is further configured to apply, in response to matching the packet to the packet flow definition data, the first ordered list of VRFs and the second ordered list of VRFs.

19. The network device of claim 18, wherein the policy rule comprises one of a Policy and Charging Control rule and an Application Detection and Control (ADC) rule.

20. The network device of claim 11, wherein the processing circuitry is configured to generate, based on the first ordered list of VRFs and the second ordered list of VRFs, a lookup table having a plurality of entries that map respective identifiers for a plurality of incoming interfaces of the service control gateway to respective VRFs of the second ordered list of VRFs, wherein the processing circuitry is configured to install the lookup table to the processing circuitry, wherein to receive the packet the processing circuitry is configured to receive, via an incoming interface associated with an identifier, the packet from the first service node that has applied the first service to the packet, wherein to send the packet the processing circuitry is configured to determine, based on the lookup table, the VRF of the second ordered list of VRFs mapped to the identifier associated with the incoming interface on which the packet was received and forward the packet using the VRF, wherein the VRF is a VRF for the second service.

21. A non-transitory computer-readable storage medium comprising instructions for causing one or more programmable processors to:

configure, by a gateway coupled to a plurality of service nodes by respective virtual private networks (VPNs), a separate input virtual routing and forwarding table (VRF) and output VRF for each of the VPNs;

receive, by the gateway, an ordered list specifying a service chain for processing packets of a packet flow through an ordered set of the service nodes, wherein the ordered list specifies the service chain as a first ordered list of input VRFs from the plurality of the input VRFs and as a second ordered list of output VRFs from the plurality of output VRFs, wherein each input VRF in the first ordered list of input VRFs represents a start point of a corresponding service, wherein each output VRF in the second ordered list of output VRFs represents an end point of a corresponding service, and wherein the first ordered list and the second ordered list define a sequence of the VPNs associated with the service nodes; and send and receive, by the gateway, packets of the packet flow in accordance with the first ordered list and the second ordered list to forward packets along the service chain.

22. A system comprising:

a first service node configured to apply a first service;

a second service node configured to apply a second service; and a network device comprising at least one processor coupled to a memory, wherein the network device is configured to receive a first ordered list of virtual private network (VPN) routing and forwarding tables (VRFs) from the plurality of VRFs, wherein each VRF in the first ordered list of VRFs represents a start point of a corresponding service from a plurality of services including a first service and a second service;

wherein the network device is configured to receive a second ordered list of VRFs from the plurality of VRFs, wherein each VRF in the second ordered list of VRFs represents an end point of a corresponding service from the plurality of services, wherein the network device is configured to receive a packet of a packet flow from the first service node that has applied the first service to the packet, wherein the network device is configured to send, based at least on the first ordered list and the second ordered list the packet to the second service node configured to apply the second service.

* * * * *